United States Patent
Togashi et al.

(10) Patent No.: US 6,441,459 B1
(45) Date of Patent: Aug. 27, 2002

(54) MULTILAYER ELECTRONIC DEVICE AND METHOD FOR PRODUCING SAME

(75) Inventors: Masaaki Togashi, Tokyo; Taisuke Ahiko; Osamu Honjyo, both of Akita-ken, all of (JP)

(73) Assignee: TDK Corporation, Tokyo (JP)

( * ) Notice: Subject to any disclaimer, the term of this patent is extended or adjusted under 35 U.S.C. 154(b) by 26 days.

(21) Appl. No.: 09/612,369

(22) Filed: Jul. 7, 2000

(30) Foreign Application Priority Data

| Jan. 28, 2000 | (JP) | 2000-019662 |
| Jan. 28, 2000 | (JP) | 2000-019663 |
| Mar. 30, 2000 | (JP) | 2000-094686 |
| Mar. 30, 2000 | (JP) | 2000-094687 |

(51) Int. Cl.$^7$ .............................................. H01L 29/00
(52) U.S. Cl. ............... 257/532; 361/301.3; 361/301.4; 361/303; 361/308.1; 361/310; 361/313; 361/328; 361/329; 361/330
(58) Field of Search .................. 257/532, 535; 361/278, 292, 301.1, 301.2, 301.3, 301.4, 301.5, 303, 305, 306.1, 306.3, 307, 308.1, 309, 310, 311, 312, 313, 328, 329, 330, 321.1, 321.2

(56) References Cited

U.S. PATENT DOCUMENTS

| 4,831,494 A | * | 5/1989 | Arnold et al. .............. 361/306 |
| 5,369,545 A | | 11/1994 | Bhattacharyya et al. |
| 5,880,925 A | | 3/1999 | DuPre et al. |
| 6,038,121 A | * | 3/2000 | Naito et al. .................. 361/303 |
| 6,072,687 A | * | 6/2000 | Naito et al. .................. 361/303 |
| 6,191,932 B1 | * | 2/2001 | Kuroda et al. ............... 361/303 |
| 6,243,253 B1 | * | 6/2001 | DuPre et al. ............. 361/306.3 |
| 6,282,079 B1 | * | 8/2001 | Nagakari et al. ........... 361/303 |

FOREIGN PATENT DOCUMENTS

JP 11-144996 5/1999

* cited by examiner

*Primary Examiner*—Ngân V. Ngô
(74) *Attorney, Agent, or Firm*—Oliff & Berridge, PLC

(57) ABSTRACT

A multilayer electronic device comprised of a capacitor body in which a plurality of internal electrodes are separately arranged in a plurality of blocks via ceramic layers. At least one lead is led out from each internal electrode. The terminal electrodes connected to each lead is arranged at the side faces of the capacitor body. The polarities of the voltages supplied to the nearby terminal electrodes in the same side face differ.

10 Claims, 29 Drawing Sheets

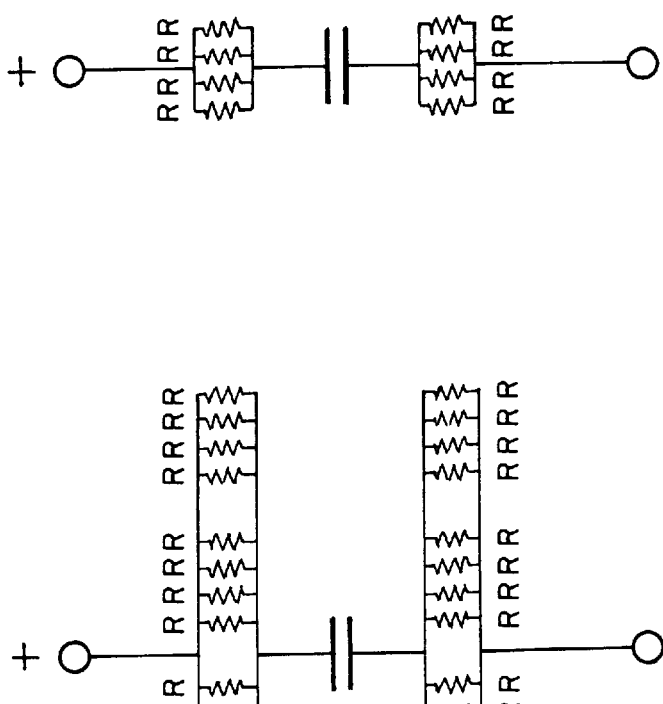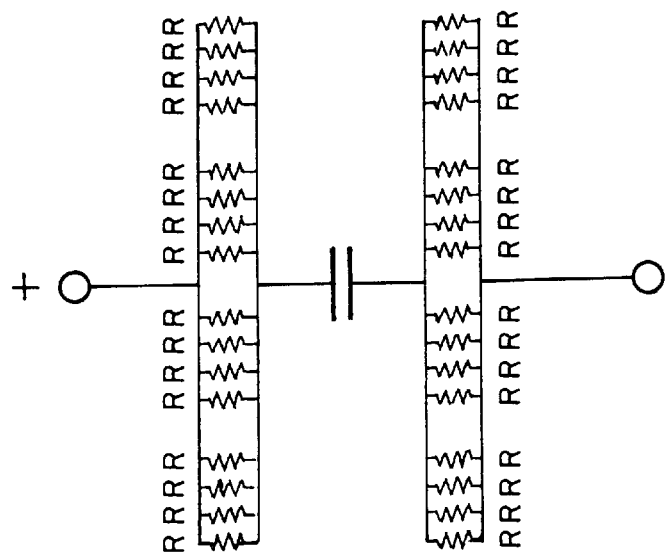

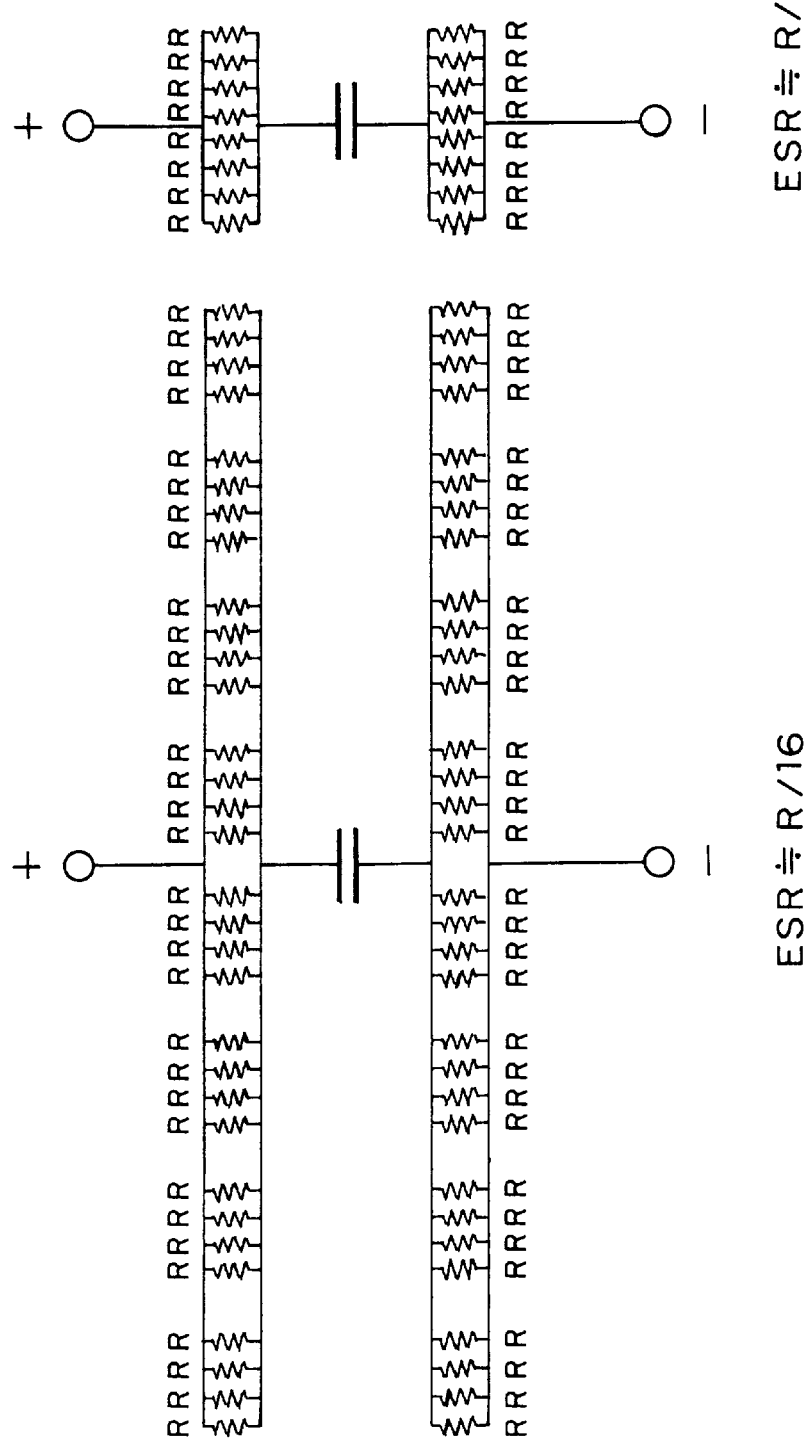
FIG. 15A  ESR ≒ R/16
FIG. 15B  ESR ≒ R/4
RELATED ART

MULTILAYER ELECTRONIC DEVICE AND METHOD FOR PRODUCING SAME

BACKGROUND OF THE INVENTION

1. Field of the Invention

The present invention relates to a multilayer electronic device reducing the equivalent serial inductance (ESL) and able to be used as a capacitor array and a method for producing the same, more particularly relates to a multiterminal multilayer capacitor and a method for producing the same.

2. Description of the Related Art

In the past, capacitors have been made wide use of as types of electronic devices. Multilayer ceramic capacitors are also being used in power supply circuits of LSIs.

On the other hand, in a power supply circuit of a CPU or other LSI in which the capacitor shown in FIG. 10 is arranged, sharp fluctuations in current sometimes occur at the time of operation of the LSI. Along with the fluctuations in current, the voltage of the power supply circuit widely fluctuates due to the inductance (L) and resistance (R) of the interconnections and the ESL and equivalent serial resistance (ESR) of the capacitor, so that the operation of the LSI is sometimes hampered.

Therefore, in the past, in a power supply circuit of an LSI, a capacitor with a low ESL has been used to suppress fluctuations in voltage accompanying sharp fluctuations in current and to thereby stabilize the power supply circuit.

In particular, recent CPUs have been required to be reduced further in ESL since operating frequencies and currents have been made higher along with higher operating speeds. Therefore, in multiterminal capacitors, one example of a multilayer ceramic chip capacitor, the directions of the currents have been controlled to become opposite between the nearby terminal electrodes.

As shown in Japanese Unexamined Patent Publication (Kokai) No. 9-17693, Japanese Unexamined Patent Publication (Kokai) No. 11-144996, U.S. Pat. No. 5,880,925, etc., the main part of a conventional reduced ESL multiterminal capacitor is comprised of a rectangular parallelopiped body configured by a plurality of internal electrodes superposed via ceramic layers so as to give an electrostatic capacity by the ceramic layers forming the body.

Further, each of these internal electrodes has two leads each led out to two or more side faces among the four side faces of the body.

Terminal electrodes connected to these leads are attached to these side faces. Note that voltages are supplied with alternatingly opposite polarities to the nearby terminal electrodes connected to the leads of the nearby internal electrodes in the stacking direction. Since the polarities of the voltages supplied to the nearby leads differ, the magnetic fluxes generated due to the high frequency currents flowing from the terminal electrodes are canceled out between these adjoining leads and therefore the ESL is reduced.

On the other hand, the stabilization of a power supply circuit depends to a large extent on the ESR of the capacitor as well. In a conventional reduced ESL capacitor, since, as mentioned above, the electrical resistance becomes smaller along with the provision of the plurality of leads. As a result, the ESR becomes extremely small, therefore the power supply circuit using such a capacitor lacked stability.

That is, the conventional reduced ESL capacitor had an extremely small ESR, so when resonance was caused due to inductance of the peripheral circuits, the voltage dropped sharply or ringing or other attenuation vibration easily occurred.

On the other hand, along with the increasing integration of circuits, capacitors etc. for power supply circuits are now being required to be a single capacitor comprised of a plurality of component capacitors giving electrostatic capacities differing in accordance with a plurality of circuits.

Further, along with the increasing integration of circuits, capacitors etc. for power supply circuits have been required to be a single capacitor comprised of a plurality of internal electrodes, but if fabricating internal electrodes differing in pattern of leads along with the number of internal electrodes, the production process is liable to become complicated and the manufacturing costs increase.

SUMMARY OF THE INVENTION

A first object of the present invention is to provide a multilayer electronic device and method of producing a multilayer electronic device not only able to prevent the ESR from becoming extremely small while reducing the ESL, but also enabling the manufacturing costs to be reduced.

A second object of the present invention is to provide a multilayer electronic device able to reduce the ESL and able to be used as a capacitor array or composite electronic device etc.

To achieve the object, a first multilayer electronic device of the present invention is comprised of a capacitor body formed by stacking dielectric layers; a plurality of internal electrodes separated by dielectric layers inside the capacitor body, each having at least one lead led out toward any side face of the capacitor body, and differing in position of arrangement of the leads with the nearby internal electrodes; and a plurality of terminal electrodes arranged at the outside surface of the capacitor body and connected to any of the plurality of internal electrodes through the leads; wherein the internal electrodes being divided into blocks of electrode patterns of a plurality of internal electrodes adjoining each other via the dielectric layers, and the electrode patterns of the internal electrodes belonging to the different blocks being the same in the shapes of the electrode patterns, but different in rotational positions about an axis perpendicular to the planes of the electrode patterns.

As a result, when supplying a current to the multilayer electronic device, the plurality of internal electrodes of each blocks connected to the outside circuits via the leads constitute electrodes arranged in parallel while facing each other to form capacitors.

According to the first multilayer electronic device of the present invention, since the leads are led out from the internal electrodes toward the side faces of the capacitor body, positive and negative currents are supplied in opposite directions to the nearby leads to cancel the magnetic fluxes. Therefore, the parasitic inductance of the multilayer electronic device itself can be reduced and the ESL is reduced.

On the other hand, by having just a single lead be led out from the portion of the internal electrode giving the electrostatic capacity and connected to a terminal electrode, it is possible to supply current concentratedly to this single lead and to increase the electrical resistance at the lead. As a result of the increase in the electrical resistance at the lead in this way, even if ESL reduction technology is adopted for supplying positive and negative currents in opposite directions between the nearby leads and canceling out the magnetic fluxes is adopted, the ESR can be prevented from becoming overly small.

Further, according to the first multilayer electronic device of the present invention, by stacking a plurality of blocks of the same repeating electrode pattern structure changed only in rotational position, there is no longer a need to fabricate internal electrodes with different lead patterns to match the number of internal electrodes, so that the production process is simplified and the manufacturing costs reduced.

Still further, according to the first multilayer electronic device of the present invention, it is also possible to incorporate a plurality of capacitors into a single multilayer electronic device. Therefore, by reducing the number of multilayer electronic devices to be mounted in an electrical product, the manufacturing costs can be reduced and, along with the increased integration of circuits, the required space can be reduced.

In the first electronic device of the present invention, preferably the capacitor body is shaped as a hexagon and the plurality of terminal electrodes are arranged at each of at least two side faces among the four side faces of the hexagonal capacitor body.

In this case, since the capacitor body is formed in a hexagonal shape—the easiest to manufacture as a multilayer electronic device—, production becomes easy. Further, since the plurality of terminal electrodes are provided at least at two side faces among the four side faces of the hexagonal capacitor body, when supplying high frequency currents to the terminal electrodes so that the terminal electrodes of the side faces alternately become positive and negative, positive and negative currents flow in opposite directions at the nearby leads. Therefore, the effect of cancellation of the magnetic flux occurs concentratedly at these side faces and the ESL is reduced more.

In the first electronic device of the present invention, preferably the terminal electrodes adjoining each other at the same side face where a plurality of terminal electrodes are provided are connected to the different internal electrodes.

In this case, by having currents flow so that the polarities of the nearby terminal electrodes become different, the magnetic fluxes generated at the leads are canceled out due to the currents flowing in the leads in opposite directions and the effect of reduction of the ESL appears even more reliably.

In the first electronic device of the present invention, preferably the capacitor body is shaped as a hexagon and the plurality of terminal electrodes are arranged at each of the four side faces of the hexagonal capacitor body.

In this case, when supplying high frequency currents to the terminal electrodes so that the terminal electrodes of the side faces become alternately positive and negative, the effect of supplying positive and negative currents in opposite directions between the nearby leads to cancel out the magnetic fluxes occurs at the four side faces and the ESL is further reduced. Further, since the terminal electrodes are arranged at the four side faces of the hexagonal shape, it is possible to make a four block stack by changing the rotational positions of four blocks respectively having a plurality of internal electrodes, so that the production process can be simplified and a multilayer electronic device having the plurality of internal electrodes can be obtained.

The method of producing a multilayer electronic device of the present invention comprises the steps of forming on a dielectric layer an internal electrode of a pattern with at least one lead led out; stacking the dielectric layers on which the internal electrodes of patterns different from each other are formed to prepare blocks respectively having a plurality of the same repeating electrode patterns; and stacking a plurality of the blocks in a state where the plurality of blocks are rotated about an axis orthogonal to the planes of the internal electrodes so that the blocks adjoining each other in the stacking direction are at mutually different rotational positions so as to form a capacitor body.

According to the method of production of the present invention, since the plurality of internal electrodes are made the block, the plurality of blocks are rotated about the axis orthogonal to the planes formed by the internal electrodes to different rotational positions, and the blocks are stacked in that state, even in a multilayer electronic device of a structure having a plurality of internal electrodes, the production process is simplified and the manufacturing costs are reduced.

The method of production of the present invention preferably further comprises, when stacking the plurality of blocks to form the capacitor body, forming the capacitor body in a hexagonal shape, arranging a plurality of terminal electrodes at each of the four side faces of the hexagonal capacitor body, and connecting the terminal electrodes to any of the internal electrodes through the leads.

To achieve the second object, the second multilayer electronic device of the present invention comprises a capacitor body formed by stacking dielectric layers; four internal electrodes each having leads led out toward two opposite side faces of the capacitor body and arranged separated by dielectric layers inside the capacitor body in a state with patterns of the leads differing from each other; and four pairs of terminal electrodes arranged outside the capacitor body and connected to any of the four internal electrodes through the leads.

According to the second multilayer electronic device of the present invention, since the leads are led out to two facing side faces of the capacitor body, currents flow straight by short routes at the time of carrying a current and the positive and negative currents intersect two-dimensionally to cancel out the magnetic fluxes among the four internal electrodes in the multilayer electronic device. As a result, the parasitic inductance of the multilayer electronic device itself is sharply reduced and the ESL is reduced.

Further, since an electrostatic capacity is obtained among the four internal electrodes, by using these divided into two internal electrodes each, it is also possible to use the device as a capacitor array or composite electronic device.

In the second electronic device of the present invention, preferably the capacitor body is shaped as a hexagon, the terminal electrodes are provided at each of the four side faces of the hexagonal capacitor body, and the two opposite side faces and the two opposite side faces positioned rotated 90 degrees from these two side faces have terminal electrode array structures able to be used as independent capacitors.

In this case, since terminal electrodes are provided at the four side faces of the hexagonal capacitor body, not only do the routes over which the currents flow become the shortest, but also, when supplying high frequency currents to the terminal electrodes so that the terminal electrodes of the side faces alternately become positive and negative, the currents intersect when flowing from the terminal electrodes of the four side faces to the internal electrodes along with the four internal electrodes connected to the terminal electrodes becoming positive and negative polarities and as a result the parasitic inductance further falls.

In the second electronic device of the present invention, preferably the terminal electrodes are arranged at the side faces of the capacitor body so that the nearby terminal electrodes are connected to mutually the different internal electrodes.

In this case, currents flow so that the polarities of the nearby terminal electrodes become different and the magnetic fluxes generated are canceled out by the high frequency currents flowing in the internal electrodes in opposite directions, so that the parasitic inductance further falls.

In the second electronic device of the present invention, preferably the internal electrodes, including leads, having mutually different electrode patterns of internal electrodes and stacked via the dielectric layers form a block and a plurality of blocks are arranged stacked and superposed to constitute the capacitor body.

In this case, it becomes easy to divide the internal electrodes into groups of pluralities of internal electrodes for use and possible to design capacitor arrays or composite electronic devices more reliably. Further, it becomes possible to use the same electrode patterns for every blocks. Even if the number of internal electrodes stacked is increased, there is no longer a need to increase the number of patterns and the production process becomes easy, which contributes to the reduction of the manufacturing costs.

In the second electronic device of the present invention, preferably a plurality of the leads are respectively led out from each internal electrode to each side face.

In this case, since the leads are provided plurally, the effect of cancellation of the magnetic flux by the intersection of the positive and negative currents two-dimensionally is enhanced.

To achieve the second object, a third multilayer electronic device of the present invention comprises a capacitor body formed by stacking dielectric layers; four internal electrodes separated by dielectric layers inside the capacitor body and each having leads led out toward three side faces of the capacitor body; and a plurality of terminal electrodes arranged at an outside surface of the capacitor body and connected to any of the four internal electrodes through the leads.

According to the third multilayer electronic device of the present invention, since the leads are led out toward three side faces of the capacitor body, the space surrounding the internal electrodes can be used more effectively than internal electrodes of a multilayer capacitor with leads led out in two directions and currents flow over straight, short routes when supplying a current. Further, by having positive and negative currents intersect more two-dimensionally to cancel out the magnetic fluxes in the four internal electrodes in the multilayer electronic device, the parasitic inductance of the multilayer electronic device itself is sharply reduced. Therefore, the ESL is reduced.

In the third electronic device of the present invention, preferably the capacitor body is shaped as a hexagon and the terminal electrodes are provided at each of the four side faces of the hexagonal capacitor body.

In this case, since internal electrodes are provided at the four side faces of the hexagonal capacitor body, it is possible to make maximum use of the space surrounding the capacitor body and the routes over which the currents flow become the shortest. Further, when supplying high frequency currents to the terminal electrodes so that the terminal electrodes of the side faces alternately become positive and negative, the four internal electrodes connected to the terminal electrodes becoming positive and negative polarities, currents intersect when flowing from the terminal electrodes of the four side faces to the internal electrodes, and, as a result, the parasitic inductance further falls.

In the third electronic device of the present invention, preferably the terminal electrodes are arranged at the side faces of the capacitor body so that the nearby terminal electrodes are connected to mutually the different internal electrodes.

In this case, currents flow so that the polarities of the nearby terminal electrodes become different and the magnetic fluxes generated are canceled by the high frequency currents flowing in the internal electrodes in opposite directions, so that the parasitic inductance further falls.

In the third electronic device of the present invention, preferably patterns of the leads of the four internal electrodes differ from one another, and the leads which are led out from two internal electrodes separated via one internal electrode to the two opposite side faces are respectively connected to the same terminal electrodes.

In this case, the parasitic inductance can be reduced while effectively reducing the number of terminal electrodes.

In the third electronic device of the present invention, preferably the internal electrodes, including leads, having mutually different electrode patterns of the internal electrodes and stacked via the dielectric layers form a block and a plurality of blocks are arranged stacked and superposed to constitute the capacitor body.

In this case, it becomes easy to divide the internal electrodes into groups of pluralities of internal electrodes for use and possible to design capacitor arrays or composite electronic devices more reliably. Further, it becomes possible to use the same electrode patterns for every blocks. Even if the number of internal electrodes stacked is increased, there is no longer a need to increase the number of patterns and the production process becomes easy, which contributes to the reduction of the manufacturing costs.

BRIEF DESCRIPTION OF THE DRAWINGS

These and other objects and features of the present invention will be explained in further detail with reference to the attached drawings, in which:

FIG. 5A is a schematic view of a model of equivalent serial resistance showing a model of the equivalent serial resistance of a conventional capacitor;

FIG. 5B is a schematic view of a model of equivalent serial resistance showing a model of the equivalent serial resistance of a multiterminal multilayer capacitor of an embodiment;

FIG. 15A is a schematic view of a model of equivalent serial resistance showing a model of the equivalent serial resistance of a conventional capacitor;

FIG. 15B is a schematic view of a model of equivalent serial resistance showing a model of the equivalent serial resistance of a multiterminal multilayer capacitor of an embodiment;

DESCRIPTION OF THE PREFERRED EMBODIMENTS

Figure 1:
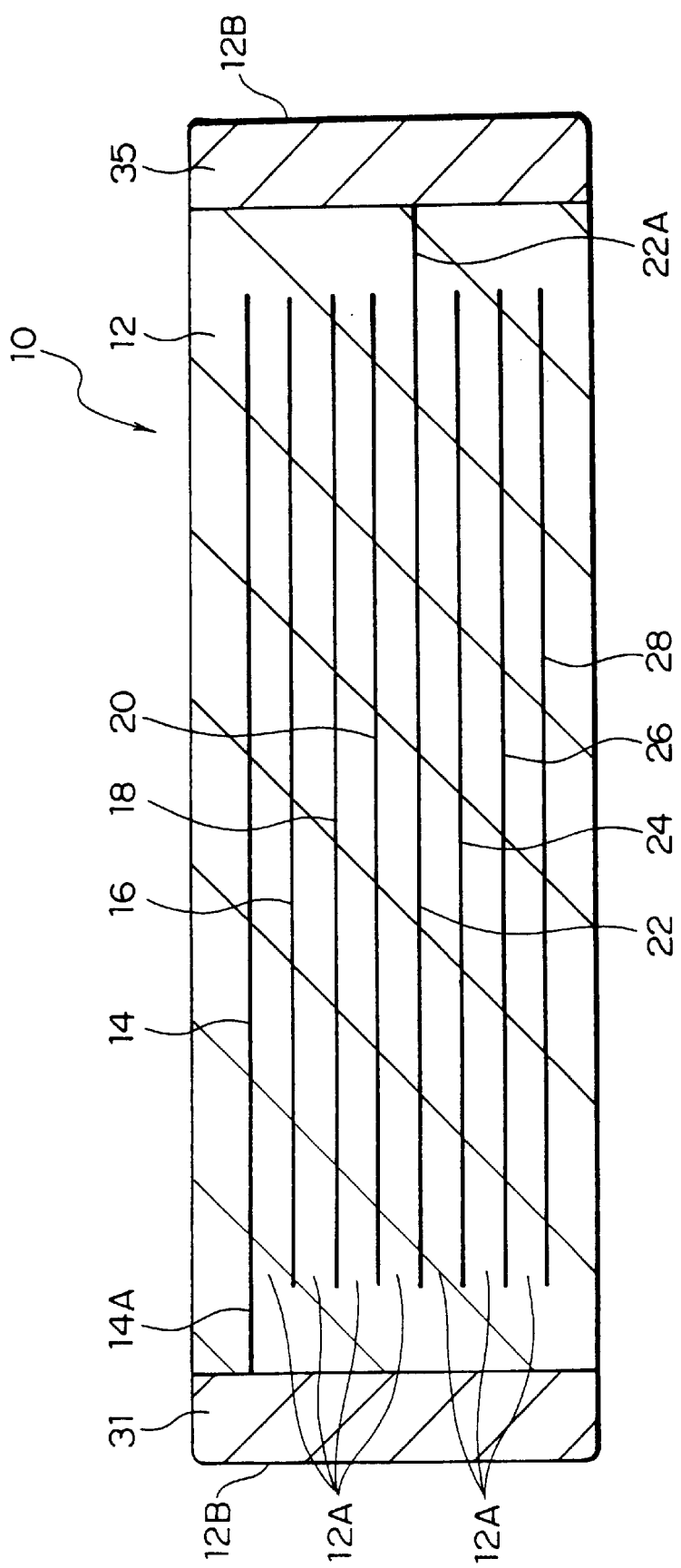
FIG. 1 is a sectional view of a multiterminal multilayer capacitor according to a first embodiment of the present invention taken along the line I—I of FIG. 3.
Figure 2:
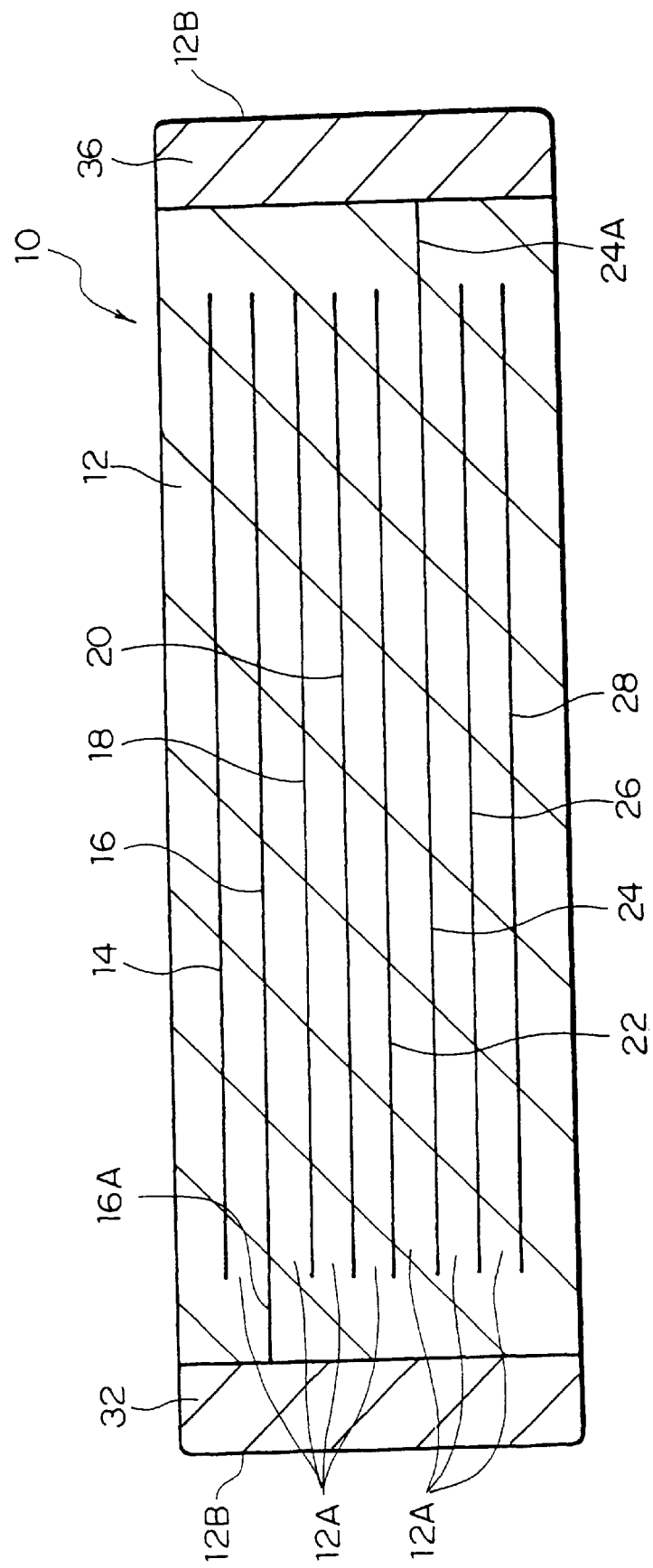
FIG. 2 is a sectional view of the multiterminal multilayer capacitor according to the first embodiment of the present invention taken along the line II—II of FIG. 3.
Figure 3:
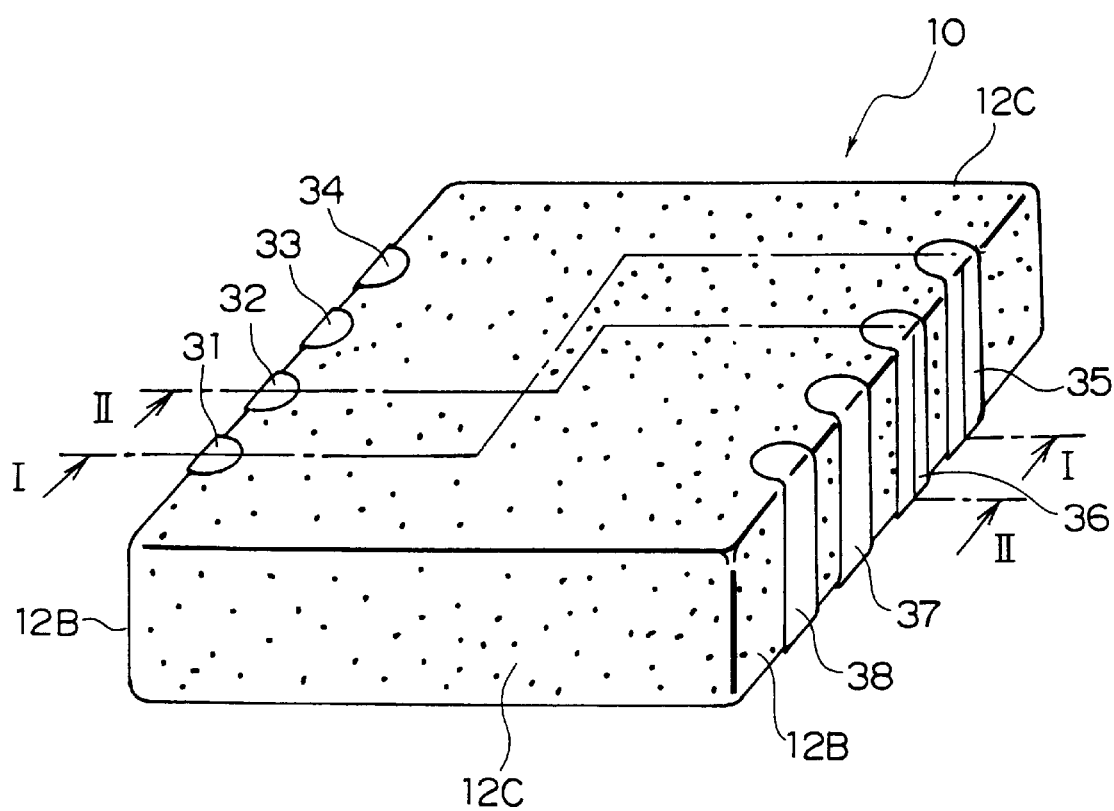
FIG. 3 is a perspective view of the multiterminal multilayer capacitor according to the first embodiment of the present invention.

The multilayer electronic device and method of production thereof of embodiments of the present invention will be described below with reference to the drawings.

First Embodiment

A multilayer electronic device according to a first embodiment of the present invention, that is, an array type multiterminal multilayer capacitor 10, is shown from FIG. 1 to FIG. 4.

As shown in these figures, the multiterminal multilayer capacitor 10 is comprised of a main portion consisting of a rectangular parallelopiped sintered body obtained by stacking a plurality of ceramic green sheets for use as dielectric layers and firing the stack, that is, a capacitor body 12.

A planar first internal electrode 14 is arranged at a predetermined height (stacking direction) position in the capacitor body 12. A similar planar second internal electrode 16 is arranged below the first internal electrode 14 separated by the ceramic layer 12A in the capacitor body 12.

A planar third internal electrode 18 is arranged below the second internal electrode 16 separated by the ceramic layer 12A in the capacitor body 12. A planar fourth internal electrode 20 is arranged below the third internal electrode 18 separated by the ceramic layer 12A in the capacitor body 12.

Further, a planar fifth internal electrode 22 is arranged below the fourth internal electrode 20 separated by the ceramic layer 12A in the capacitor body 12. A planar sixth internal electrode 24 is arranged below the fifth internal electrode 22 separated by the ceramic layer 12A in the capacitor body 12.

A planar seventh internal electrode 26 is arranged below the sixth internal electrode 24 separated by the ceramic layer 12A in the capacitor body 12. A planar eighth internal electrode 28 is arranged below the seventh internal electrode 26 separated by the ceramic layer 12A in the capacitor body 12.

Therefore, the first internal electrode 14 to the eighth internal electrode 28 are arranged facing each other separated by ceramic layers 12A in the capacitor body 12. The center of these first internal electrode 14 to eighth internal electrode 28 is arranged to be at substantially the same position as the center of the capacitor body 12. Further, the longitudinal and lateral dimensions of the first internal electrode 14 to the eighth internal electrode 28 are made smaller than the lengths of the corresponding sides of the capacitor body 12.

Figure 4:
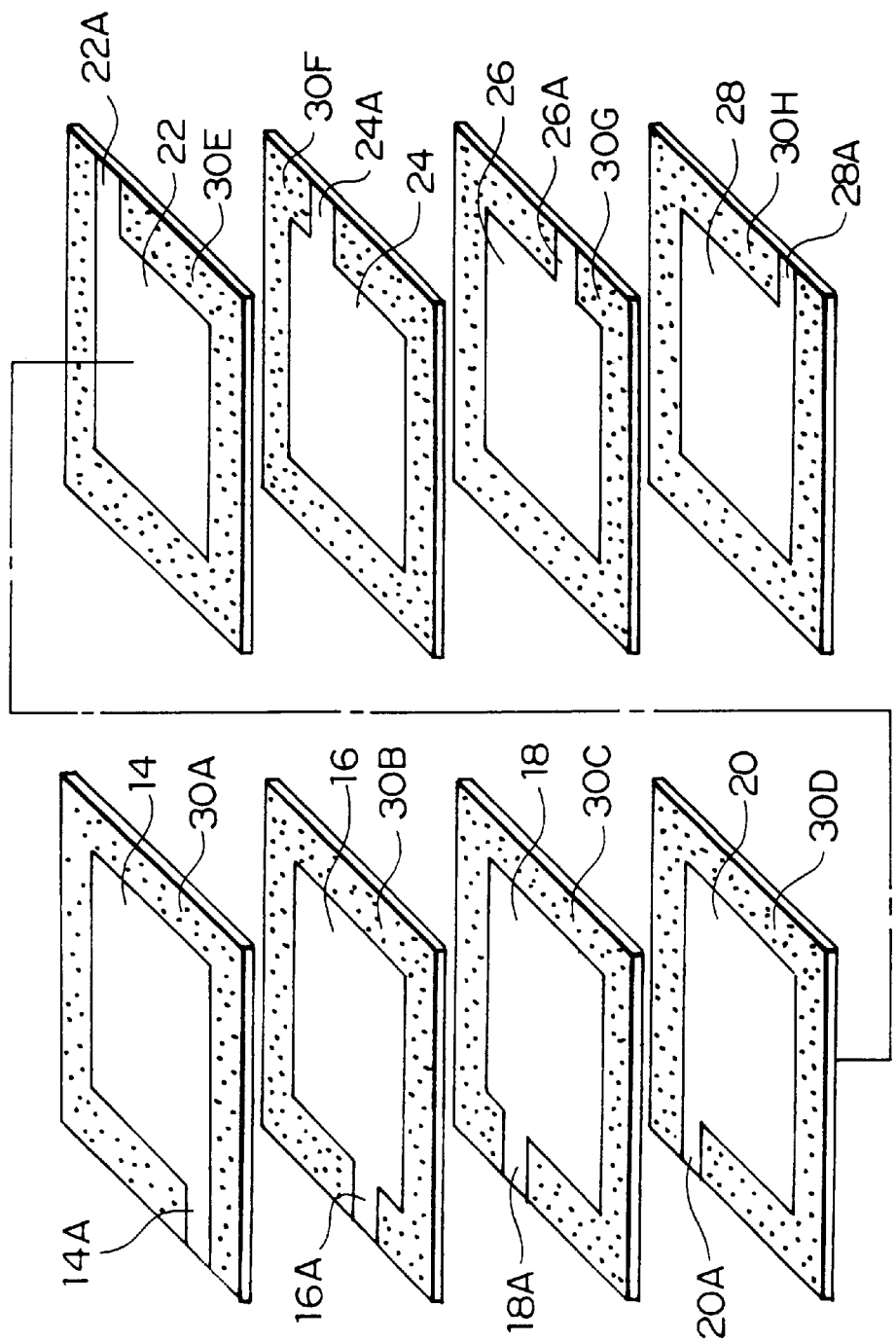
FIG. 4 is a disassembled perspective view of a plurality of ceramic green sheets and electrode shapes used in the process of production of the multiterminal multilayer capacitor of the first embodiment.

Further, as shown in FIG. 4, by leading out one electrode from the end of the illustrated front side of the first internal electrode 14 toward the left direction, one lead 14A is formed at the first internal electrode 14. Further, by leading out one electrode from the end of the illustrated rear side of the fourth internal electrode 20 toward the left direction, one lead 20A is formed at the fourth internal electrode 20.

Further, by leading out one electrode from the end of the illustrated rear side of the fifth internal electrode 22 toward the right direction, one lead 22A is formed at the fifth internal electrode 22. Further, by leading out one electrode from the portion of the sixth internal electrode 24 near the illustrated rear side toward the right direction, one lead 24A is formed at the sixth internal electrode 24.

On the other hand, by leading out one electrode from the portion of the seventh internal electrode 26 near the illustrated front side toward the right direction, one lead 26A is formed at the seventh internal electrode 26. Further, by leading out one electrode from the end of the illustrated front side of the eighth internal electrode 28 toward the right direction, one lead 28A is formed at the eighth internal electrode 28.

Due to the above, a total of eight lead portions from the leads 14A to 28A are led out from the internal electrodes 14 to 28 at non-overlapping positions.

Further, in the same way as a conventional multiterminal multilayer capacitor with terminal electrodes arranged at the side faces, as shown from FIG. 1 to FIG. 4, the first terminal electrode 31 connected to the lead 14A of the internal electrode 14, the second terminal electrode 32 connected to the lead 16A of the internal electrode 16, the third terminal electrode 33 connected to the lead 18A of the internal electrode 18, and the fourth terminal electrode 34 connected to the lead 20A of the internal electrode 20 are arranged at the left side face 12B of the capacitor body 12.

That is, since the lead 14A of the first internal electrode 14 to the lead 20A of the fourth internal electrode 20 are positioned at the left side of the internal electrodes in FIG. 4 without overlapping, the terminal electrodes 31 to 34 are arranged at the left side face 12B of the capacitor body 12 in a manner with adjoining terminal electrodes successively connected at different internal electrodes 14 to 20 through the leads 14A to 20A, and for example the adjoining terminal electrodes can be used at opposite polarities.

Further, in the same way as a conventional multiterminal multilayer capacitor 110 with terminal electrodes arranged at the side faces, as shown in FIG. 1 to FIG. 4, the fifth terminal electrode 35 connected to the lead 22A of the internal electrode 22, the sixth terminal electrode 36 connected to the lead 24A of the internal electrode 24, the seventh terminal electrode 37 connected to the lead 26A of the internal electrode 26, and the eighth terminal electrode 38 connected to the lead 28A of the internal electrode 28 are arranged at the right side face 12B of the capacitor body 12.

That is, since the lead 22A of the fifth internal electrode 22 to the lead 28A of the eighth internal electrode 20 are positioned at the right side of the internal electrodes in FIG. 4 without overlapping, the terminal electrodes 35 to 38 are arranged at the right side face 12B of the capacitor body 12 in a manner with adjoining terminal electrodes successively connected at different internal electrodes 22 to 28 through the leads 22A to 28A, and for example the adjoining terminal electrodes can be used at opposite polarities.

Due to the above, in the present embodiment, by having the terminal electrodes 31 to 34 arranged at the left side face 12B of the multiterminal multilayer capacitor 10 and having the terminal electrodes 35 to 38 arranged at the right side face 12B, the terminal electrodes 31 to 38 are arranged at the two side faces 12B among the four side faces 12B and 12C of the capacitor body 12 made the rectangular parallelopiped, that is, the hexagonal shape.

Next, an explanation will be given of the production of the multiterminal multilayer capacitor 10 according to the present embodiment with reference to FIG. 4.

First, when producing the multiterminal multilayer capacitor 10, a plurality of ceramic green sheets 30A, 30B, 30C, 30D, 30E, 30F, 30G, and 30H comprised of dielectric materials functioning as capacitors is provided.

As shown in FIG. 4, to form the internal electrodes 14, 16, 18, and 20 each having one lead 14A, 16A, 18A, and 20A led out to the left direction, electrode forming portions are arranged corresponding to these internal electrodes 14, 16, 18, and 20 on the top faces of the ceramic green sheets 30A, 30B, 30C, and 30D.

Further, to form the internal electrodes 22, 24, 26, and 28 each having one lead 22A, 24A, 26A, and 28A led out to the right direction, electrode forming portions are arranged corresponding to these internal electrodes 22, 24, 26, and 28 on the top faces of the ceramic green sheets 30E, 30F, 30G, and 30H.

Further, the electrode forming portions arranged on the top faces of the ceramic green sheets 30A to 30H are for example provided by printing on depositing a conductive paste. Further, the sheet thickness etc. may be made different between the ceramic green sheets 30A to 30D and the ceramic green sheets 30E to 30H in accordance with the required characteristics.

Next, the ceramic green sheets 30A to 30H with rectangular planar shapes are stacked in the order of the figure so that the first terminal electrode 31 connected to the lead 14A of the internal electrode 14, the second terminal electrode 32 connected to the lead 16A of the internal electrode 16, the third terminal electrode 33 connected to the lead 18A of the internal electrode 18, the fourth terminal electrode 34 connected to the lead 20A of the internal electrode 20, the fifth terminal electrode 35 connected to the lead 22A of the internal electrode 22, the sixth terminal electrode 36 connected to the lead 24A of the internal electrode 24, the seventh terminal electrode 37 connected to the lead 26A of the internal electrode 26, and the eighth terminal electrode 38 connected to the lead 28A of the internal electrode 28 are arranged around the stacked ceramic green sheets.

Further, the top face of the first internal electrode 14 and the portions between the terminal electrodes 31 to 38 are covered by the same material as the ceramic green sheets which is then cofired so as to obtain a multiterminal multilayer capacitor 10 with terminal electrodes 31 to 34 arranged at the left side face 12B and the terminal electrodes 35 to 38 arranged at the right side face 12B among the four side faces 12B and 12C of the capacitor body 12.

Next, the action of the multiterminal multilayer capacitor 10 according to the present embodiment will be explained.

Eight internal electrodes 14 to 28 are arranged separated by ceramic layers 12a in the capacitor body 12 formed by stacking ceramic or other dielectric layers. Further, these eight internal electrodes 14 to 28 have leads 14A to 28A led out toward two facing side faces 12B of the capacitor body 12. A total of eight terminal electrodes 31 to 38 are arranged outside the capacitor body 12.

Among these leads 14A to 28A, the first terminal electrode 31 is connected to the internal electrode 14 through the lead 14A, the second terminal electrode 32 is connected to the internal electrode 16 through the lead 16A, the third terminal electrode 33 is connected to the internal electrode 18 through the lead 18A, and the fourth terminal electrode 34 is connected to the internal electrode 20 through the lead 20A.

These internal electrodes 14, 16, 18, and 20 and terminal electrodes 31, 32, 33, and 34 constitute a single capacitor. When supplying a current to this capacitor, these terminal electrodes 31 to 34 successively alternately become positive and negative polarities, and the four internal electrodes 14 to 20 connected to the terminal electrodes 31 to 34 through the leads 14A to 20A form electrodes of the capacitor arranged in parallel facing each other.

Further, the fifth terminal electrode 35 is connected to the internal electrode 22 through the lead 22A, the sixth terminal electrode 36 is connected to the internal electrode 24 through the lead 24A, the seventh terminal electrode 37 is connected to the internal electrode 26 through the lead 26A, and the eighth terminal electrode 38 is connected to the internal electrode 28 through the lead 28A.

Further, these internal electrodes 22, 24, 26, and 28 and terminal electrodes 35, 36, 37, and 38 constitute another capacitor. When supplying a current to this capacitor, these terminal electrodes 35 to 38 successively alternately become positive and negative polarities, and the four internal electrodes 22 to 28 connected to the terminal electrodes 35 to 38 through the leads 22A to 28A form electrodes of the capacitor arranged in parallel facing each other.

Further, in this embodiment, the capacitor body 12 is formed in a hexagonal shape, four terminal electrodes 31 to 38 each are arranged at the two side faces 12B among the four side faces 12B and 12C of the hexagonal capacitor body 12, these terminal electrodes 31 to 34 arranged at the same side face 12B are connected to the successively different internal electrodes 14 to 20, and the terminals electrodes 35 to 38 arranged in the same identical side face 12B are connected to successively different internal electrodes 22 to 28. Therefore, in the multiterminal multilayer capacitor 10 of this structure, when high frequency currents alternating in polarity so that the polarities of the adjoining terminal electrodes among the terminal electrodes 31 to 34 and terminal electrodes 35 to 38 become different flow to the terminal electrodes 31 to 34 and terminal electrodes 35 to 38, currents flow in opposite directions in the adjoining leads, so the effect of cancellation of the magnetic fluxes arises concentratedly at these side faces 12B and the ESL is reduced.

On the other hand, by providing single leads 14A to 28A connected to the terminal electrodes 31 to 38 led out from portions of the internal electrodes 14 to 28 giving the electrostatic capacity, the currents flow concentratedly at the single leads and the electrical resistances at the leads 14A to 28A can be increased. Further, as a result of the increase of the electrical resistances at the leads 14A to 28A in this way, even if the ESL reduction technology is employed for supplying positive and negative currents in opposite directions between adjoining leads to cancel out the magnetic fluxes, the ESR can be prevented from becoming excessively small.

Further, in the present embodiment, since two capacitors are substantially included in a single multiterminal multilayer capacitor 10 in the above way, the number of multiterminal multilayer capacitor 10 is reduced, so the manufacturing costs are reduced and the space taken up can be reduced as required along with the increasing integration of circuits.

Next, results of tests conducted to compare the ESL and ESR between the multiterminal multilayer capacitor 10 according to the present embodiment and another capacitor will be shown. Further, the other capacitor compared with here is a multiterminal multilayer capacitor reduced in ESL by being provided with four leads for one internal electrode and has the same eight internal electrodes as the multiterminal multilayer capacitor 10 of the present embodiment. Further, the electrostatic capacity used in the tests is 1 μF.

As a result of the tests, the ESL of the conventional reduced ESL multiterminal multilayer capacitor was found to be 126 pH and the ESR was found to be 2.4 mΩ. As opposed to this, the ESL of the multiterminal multilayer capacitor according to the present embodiment was found to be 123 pH and the ESR was found to be 9.8 mΩ.

That is, while the ESLs were substantially the same as each other, the ESR of the multiterminal multilayer capacitor 10 of the present embodiment became about four times larger than the conventional multiterminal multilayer capacitor.

This is believed to be because while the ESR of the conventional capacitor was about R/8 from the model of the ESR shown in FIG. 5A, the ESR of the multiterminal multilayer capacitor 10 of the present embodiment was about R/2 from the model of the ESR shown in FIG. 5B. Further, in FIG. 5A and FIG. 5B, "R" shows the electrical resistance at the leads.

Figure 6B:
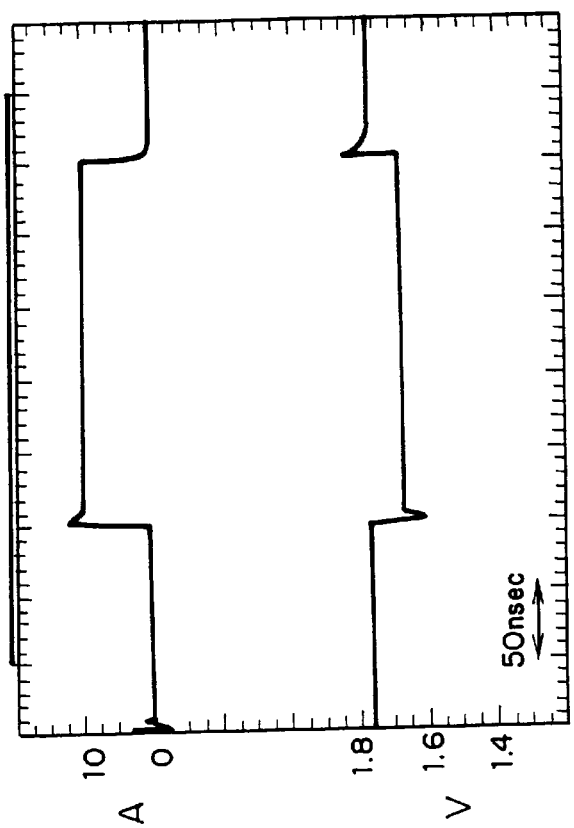
FIG. 6B is a graph of the relationship between current and voltage in a model of a power supply circuit of an LSI showing the relationship of current and voltage of a multiterminal multilayer capacitor of an embodiment.
Figure 6A:
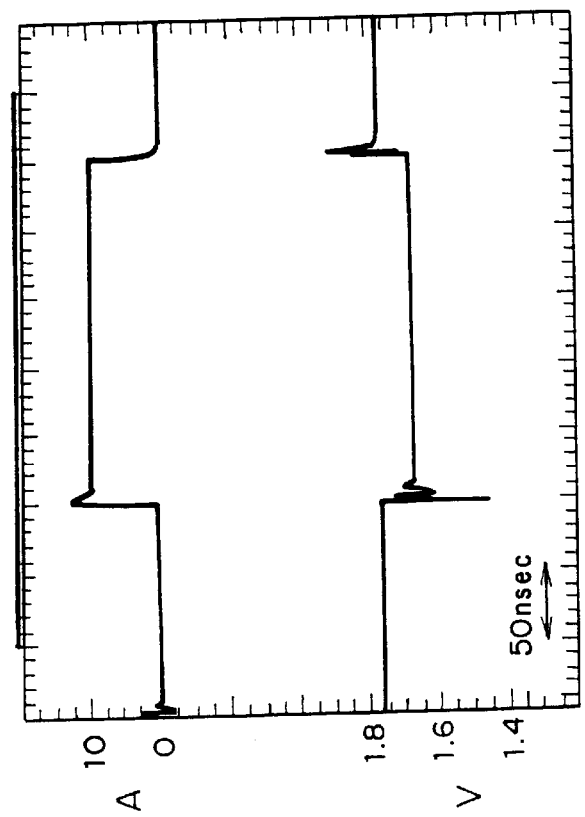
FIG. 6A is a graph of the relationship between current and voltage in a model of a power supply circuit of an LSI showing the relationship of current and voltage of a conventional capacitor.

Further, a comparison of the voltage fluctuations of the power supply circuit accompanying sharp current fluctuations is shown in FIG. 6A and FIG. 6B. That is, while the conventional capacitor shown in FIG. 6A suffered from a large voltage fluctuation, the multiterminal multilayer capacitor 10 of the present embodiment shown in FIG. 6B has a far smaller voltage fluctuation as a result of the larger ESR and the power supply circuit is stabilized.

Next, an example of use of the multiterminal multilayer capacitor 10 according to the present embodiment will be explained based on FIG. 7.

Figure 7:
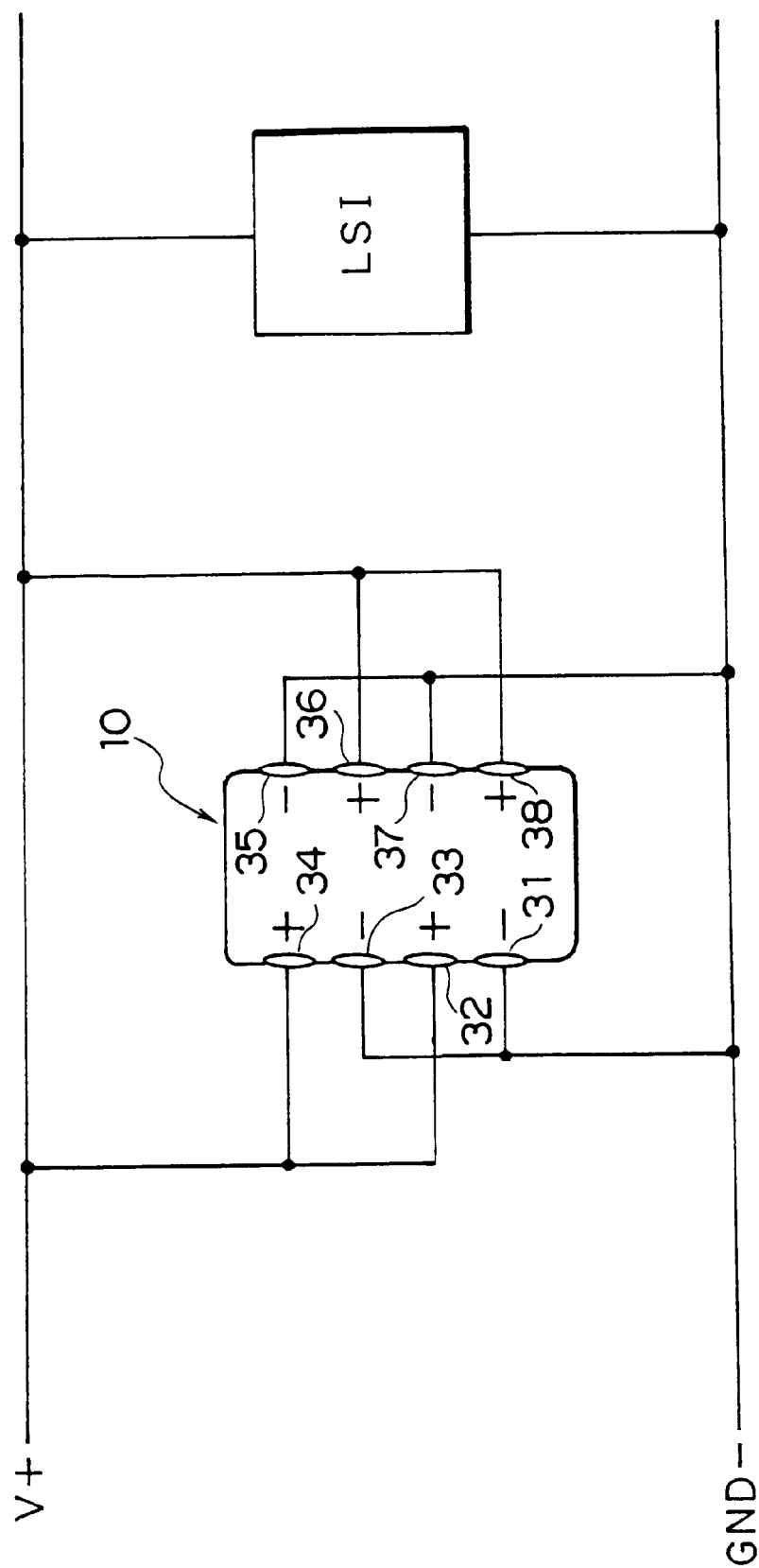
FIG. 7 is a view of the state of use of the multiterminal multilayer capacitor according to the first embodiment.

As shown in FIG. 7, the multiterminal multilayer capacitor 10 of the present embodiment is arranged in parallel with the LSI chip between the ground terminal GND and a terminal "V" having a predetermined potential. The terminal electrodes 31 to 34 positioned at the left side in the figure of the multiterminal multilayer capacitor 10 and the internal electrodes 14 to 20 connected to the terminal electrodes 31 to 34 constitute one capacitor, while the terminal electrodes 35 to 38 positioned at the right side in the figure of the multiterminal multilayer capacitor 10 and the internal electrodes 22 to 28 connected to the terminal electrodes 35 to 38 constitute another capacitor, so two capacitors are substantially connected in parallel to the LSI chip.

Figure 10:
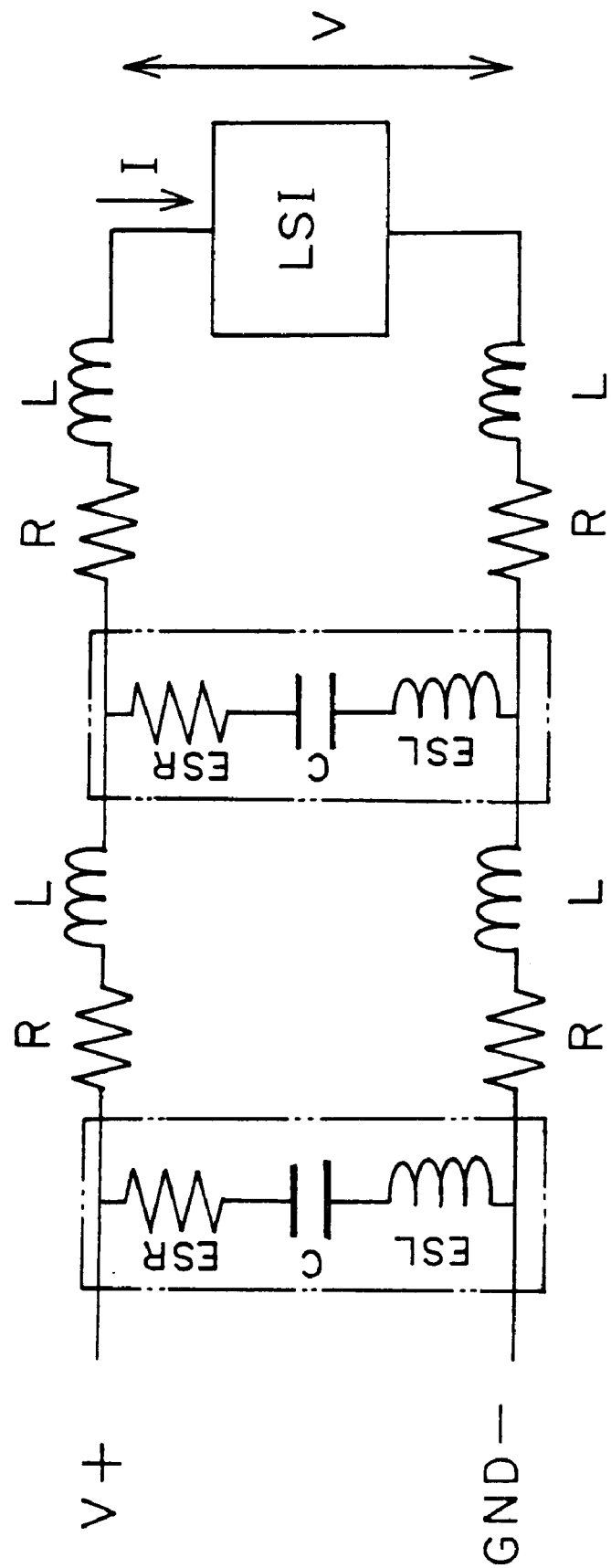
FIG. 10 is a circuit diagram of a model of power supply circuit of an LSI.

An equivalent circuit diagram of FIG. 7 is given in FIG. 10. In FIG. 10, "C" indicates the electrostatic capacity of the capacitor, ESL indicates the equivalent serial inductance in the capacitor, and ESR indicates the equivalent serial resistance. As shown in FIG. 10, in the power supply circuit of a CPU or other LSI in which a capacitor is arranged, at the time of operation of the LSI, sharp current fluctuations occur as shown in FIG. 6A. In a conventional capacitor, the voltage of the power supply circuit sometimes largely fluctuates and the operation of the LSI is hampered along with such current fluctuations. In the capacitor of the present embodiment, as shown in FIG. 6B, there is little fluctuation in the voltage of the power supply circuit and there is no worry about the operation of the LSI being hampered.

Further, by making the electrostatic capacities of the two capacitors formed inside the capacitor of the present embodiment different in accordance with the application, it becomes possible to use one as a high frequency capacitor and use the other as a low frequency capacitor.

Second Embodiment

Next, an explanation will be given of a multilayer electronic device according to a second embodiment of the present invention based on FIG. 8 and FIG. 9. Members the same as members explained in the first embodiment are given the same reference numerals and overlapping explanations are omitted.

Figure 9:
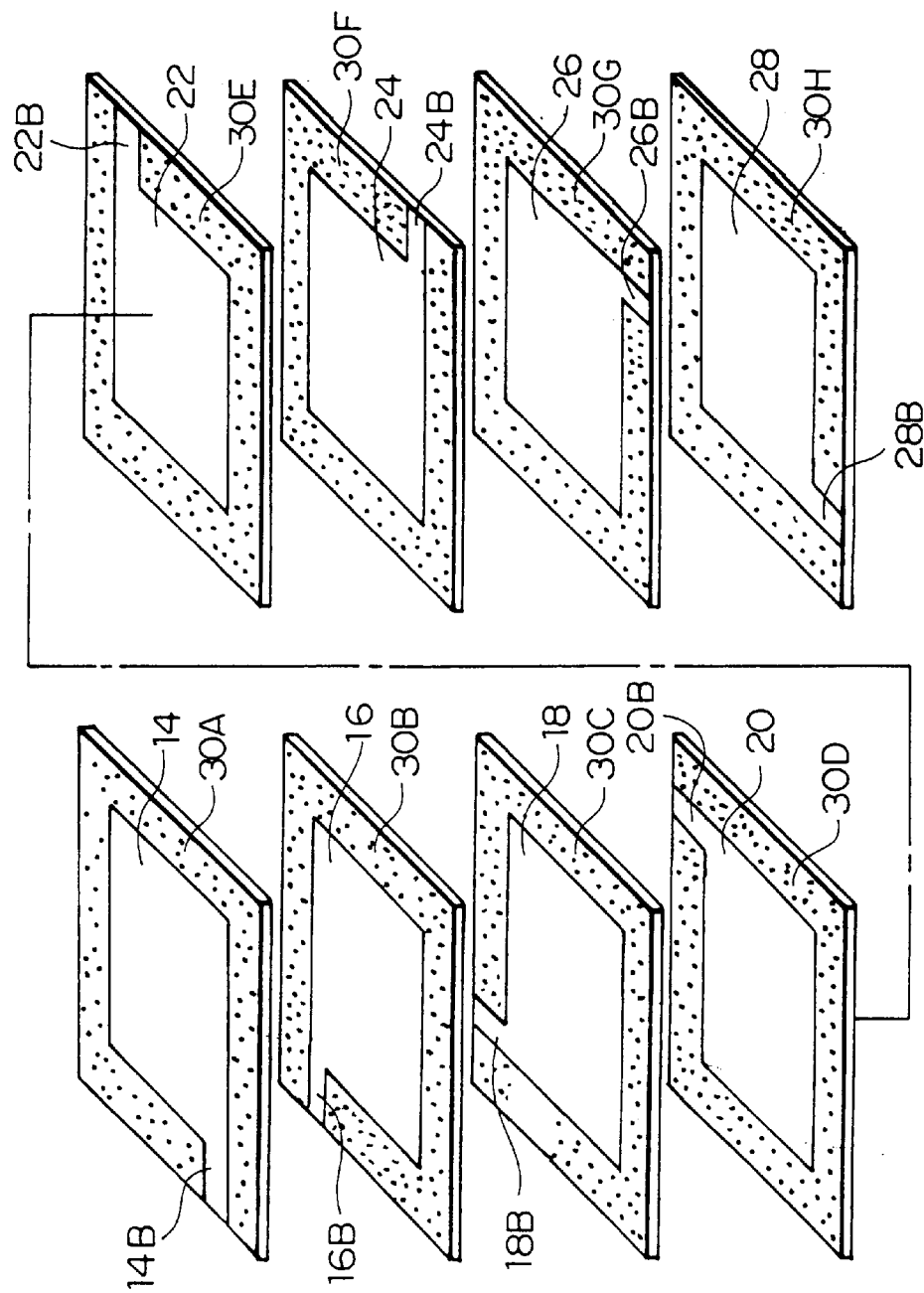
FIG. 9 is a disassembled perspective view of a plurality of ceramic green sheets and electrode shapes used in the process of production of the multiterminal multilayer capacitor of the another embodiment.

As shown in FIG. 9, by leading out one electrode from the end of the illustrated front side of the first internal electrode 14 toward the left direction, one lead 14B is formed at the first internal electrode 14. Further, by leading out one electrode from the end of the illustrated rear side of the second internal electrode 16 toward the left direction, one lead 16B is formed at the second internal electrode 16. On the other hand, by leading out one electrode from the left end of the third internal electrode 18 in the illustrated front direction, one lead 18B is formed at the third internal electrode 18. Further, by leading out one electrode from the right end of the fourth internal electrode 20 toward the illustrated rear side direction, one lead 20B is formed at the fourth internal electrode 20.

Further, by leading out one electrode from the end of the illustrated front side of the fifth internal electrode 22 toward the right direction, one lead 22B is formed at the fifth internal electrode 22. Further, by leading out one electrode from the end of the illustrated front side of the sixth internal electrode 24 toward the right direction, one lead 24B is formed at the sixth internal electrode 24. On the other hand, by leading out one electrode from the right end of the seventh internal electrode 26 toward the illustrated front side direction, one lead 26B is formed at the seventh internal electrode 26. Further, by leading out one electrode from the left end of the eighth internal electrode 28 toward the illustrated front side direction, one lead 28B is formed at the eighth internal electrode 28.

Due to the above, a total of eight lead portions from the leads 14B to 28B are led out from the internal electrodes 14 to 28 at non-overlapping positions.

Figure 8:
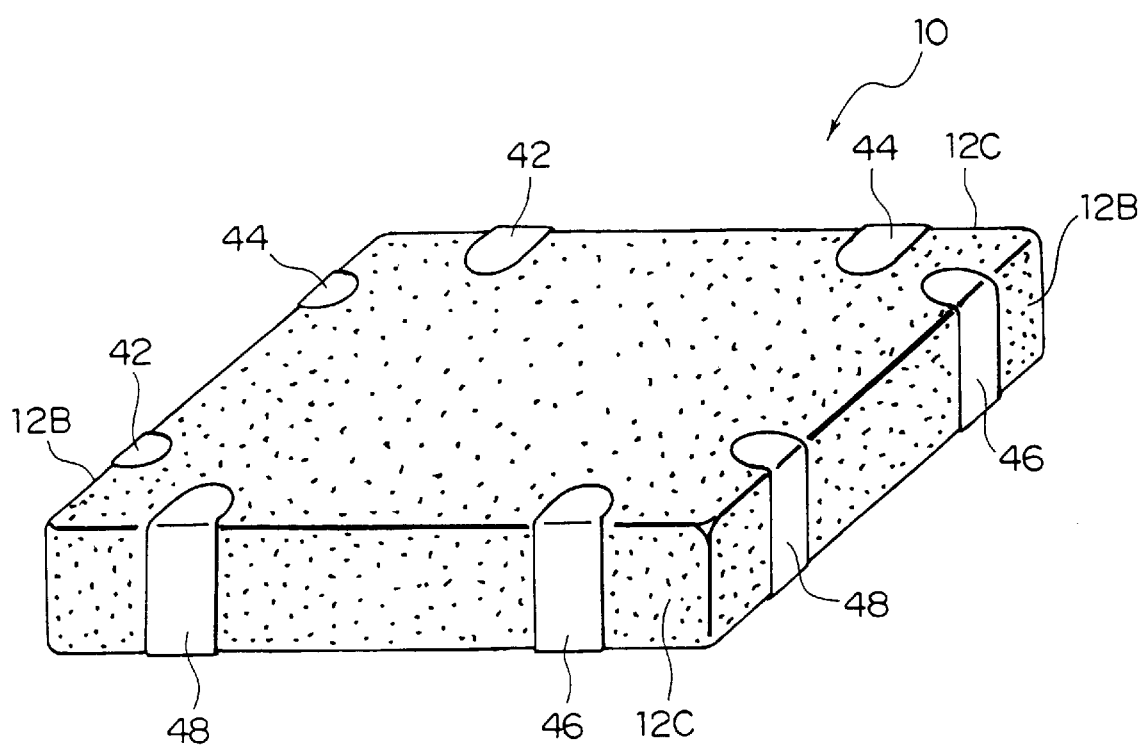
FIG. 8 is a perspective view of a multiterminal multilayer capacitor according to another embodiment of the present invention.

Further, unlike the first embodiment, two first terminal electrodes 42 separately connected to the leads 14B and 18B of the internal electrodes 14 and 18 and two second terminal electrodes 44 separately connected to the leads 16A and 20B of the internal electrodes 16 and 20 are, as shown in FIG. 8, arranged at the left side face 12B and the illustrated front side face 12C of the capacitor body 12.

Further, two third terminal electrodes 46 separately connected to the leads 22B and 26B of the internal electrodes 22 and 26 and two fourth terminal electrodes 48 separately connected to the leads 24B and 28B of the internal electrodes 24 and 28 are arranged at the right side face 12B and the illustrated front side face 12C of the capacitor body 12.

Further, the leads led out toward the same side face are positioned so as not to overlap with each other in the same way as the first embodiment. Therefore, the adjoining terminal electrodes 42 to 44 are connected to the different internal electrodes 14 and 16 and internal electrodes 18 and 20 through the leads 14B to 20B and, further, the adjoining terminal electrodes 46 and 48 are connected to the different internal electrodes 22 and 24 and internal electrodes 26 and 28 through the leads 22B to 28B.

Due to the above, in the present embodiment, terminal electrodes 42, 44, 46, and 48 are arranged two each at the four side faces 12B and 12C of the capacitor body 12 made the rectangular parallelopiped, that is, the hexagonal shape.

Therefore, since a plurality of terminal electrodes 42, 44, 46, and 48 are provided at each at the four side faces 12B and 12C of the hexagonal capacitor body 12, when supplying high frequency currents to the terminal electrodes 42, 44, 46, and 48 so that the terminal electrodes of the side faces become alternately positive and negative, positive and negative currents flow in opposite directions at the adjoining leads. Further, the effect of cancellation of the magnetic fluxes by the positive and negative currents flowing in opposite directions arises at the four side faces 12B and 12C and therefore the ESL is reduced.

On the other hand, in this embodiment as well, in the same way as the first embodiment, since the currents flow concentratedly to the single leads 14B to 28B and the electrical resistances at the leads 14B to 28B increase, the ESL is lowered and the ESR can be prevented from becoming extremely small. Further, in the same way as the first embodiment, the manufacturing costs are reduced and the space taken up can be reduced.

Further, while the multiterminal multilayer capacitor 10 according to the present embodiment is structured with eight internal electrodes 14 to 28, it is constructed from two capacitors, that is, the one capacitor giving an electrostatic capacity between the four internal electrodes 14 to 20 and the one capacitor giving an electrostatic capacity between the four internal electrodes 22 to 28, so as to handle two circuits. The number of the internal electrodes is not however limited to four. It is possible to provide two each for example, that is, four capacitors, so as to handle four circuits. Further, the overall number of the internal electrodes is not limited to eight and may be four, six, 10, 12, 14, or 16. Even more is also possible. Further, if structuring the capacitor with such a large number of internal electrodes, an even greater number of circuits can be dealt with.

Third Embodiment

A multilayer electronic device according to a third embodiment of the present invention, that is, an array type multiterminal multilayer capacitor 110, is shown from FIG. 11 to FIG. 14. As shown in these figures, the multiterminal multilayer capacitor 110 is comprised of a main portion consisting of a rectangular parallelopiped sintered body obtained by stacking a plurality of ceramic green sheets for use as dielectric layers and firing the stack, that is, a capacitor body 12.

A planar first internal electrode 114 is arranged at a predetermined height position in the capacitor body 112. A similar planar second internal electrode 116 is arranged below the first internal electrode 114 separated by the ceramic layer 112A in the capacitor body 112.

A planar third internal electrode 118 is arranged below the second internal electrode 116 separated by the ceramic layer 112A in the capacitor body 112. A planar fourth internal electrode 120 is arranged below the third internal electrode 118 separated by the ceramic layer 112A in the capacitor body 112.

Therefore, the first internal electrode 114 to the fourth internal electrode 120 are arranged facing each other separated by ceramic layers 112A in the capacitor body 112. The center of these first internal electrode 114 to fourth internal electrode 120 is arranged to be at substantially the same position as the center of the capacitor body 112. Further, the longitudinal and lateral dimensions of the first internal electrode 114 to the fourth internal electrode 120 are made smaller than the lengths of the corresponding sides of the capacitor body 112.

Figure 14:
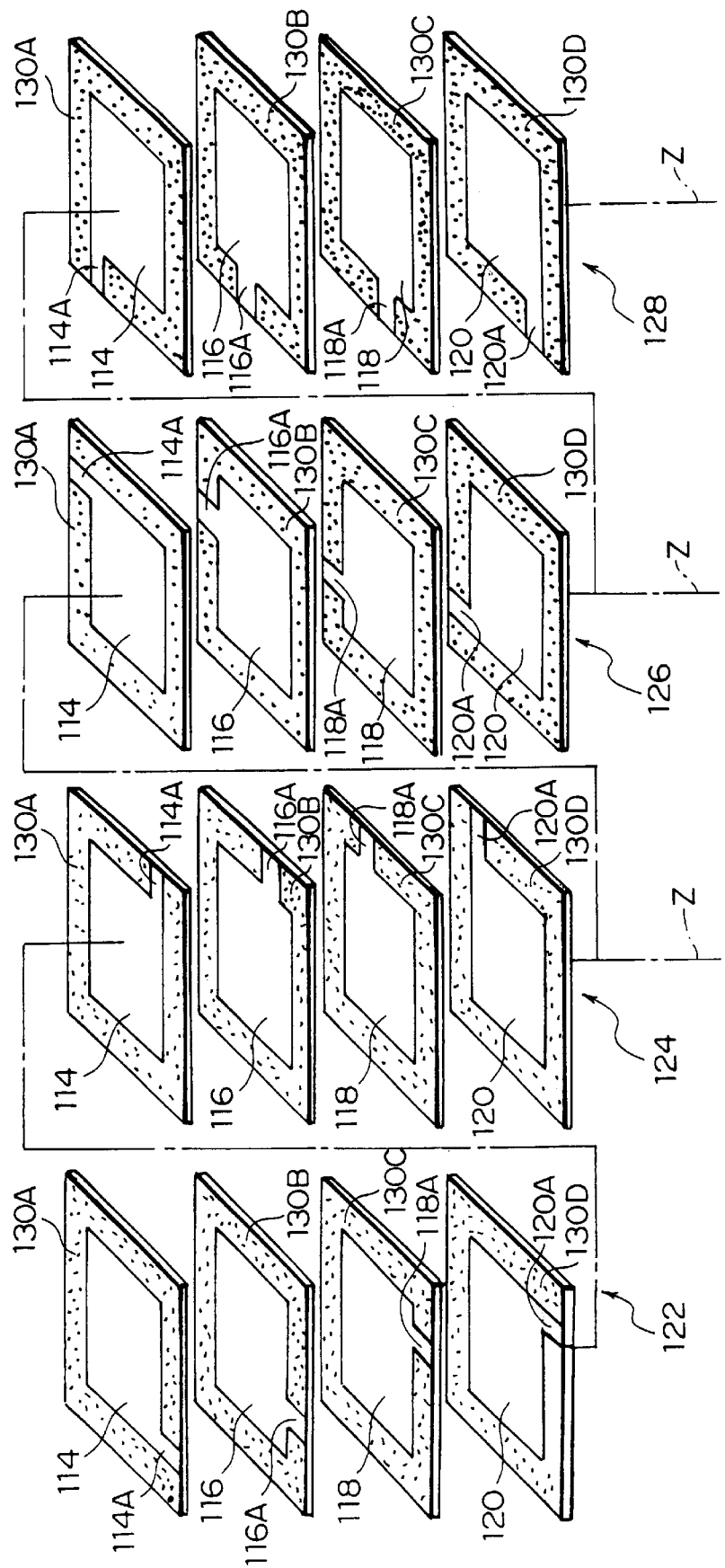
FIG. 14 is a disassembled perspective view of a plurality of green sheets and electrode shapes used in the process of production of the multiterminal multilayer capacitor of the another embodiment.

Further, as shown in FIG. 14, by leading out one electrode from the left end of the first internal electrode 114 toward the illustrated front direction, one lead 114A is formed at the first internal electrode 114. Further, by leading out one electrode from the portion of the second internal electrode 116 near the left side toward the illustrated front direction, one lead 116A is formed at the second internal electrode 116.

On the other hand, by leading out one electrode from the portion of the third internal electrode 118 near the right side toward the illustrated front side, one lead 118A is formed at the third internal electrode 118. Further, by leading out one electrode from the right end of the fourth internal electrode 120 toward the illustrated front direction, one lead 120A is formed at the fourth internal electrode 120.

Due to the above, a total of four lead portions from the leads 114A to 120A are led out from the internal electrodes 114 to 120 at non-overlapping positions.

Further, four internal electrodes 114 to 120 having leads 114A to 120A led out to the illustrated front directions are made a first block 122 and a plurality of blocks of the same structure as the first block 122 are provided as explained below.

That is, a second block 124 is stacked below the first block 122 in a state with that block rotated 90 degrees about a Z-axis perpendicular to the planes formed by the internal electrodes 114 to 120 and the leads 114A to 120A led out in the right direction of FIG. 14. Further, a third block 126 is stacked below the second block 124 in a state with that block rotated 180 degrees about a Z-axis perpendicular to the planes formed by the internal electrodes 114 to 120 and the leads 114A to 120A led out in the illustrated rear direction of FIG. 14. Similar, a fourth block 128 is stacked below the third block 126 in a state with that block rotated 270 degrees about a Z-axis perpendicular to the planes formed by the internal electrodes 114 to 120 and the leads 114A to 120A led out in the left direction of FIG. 14.

Figure 11:
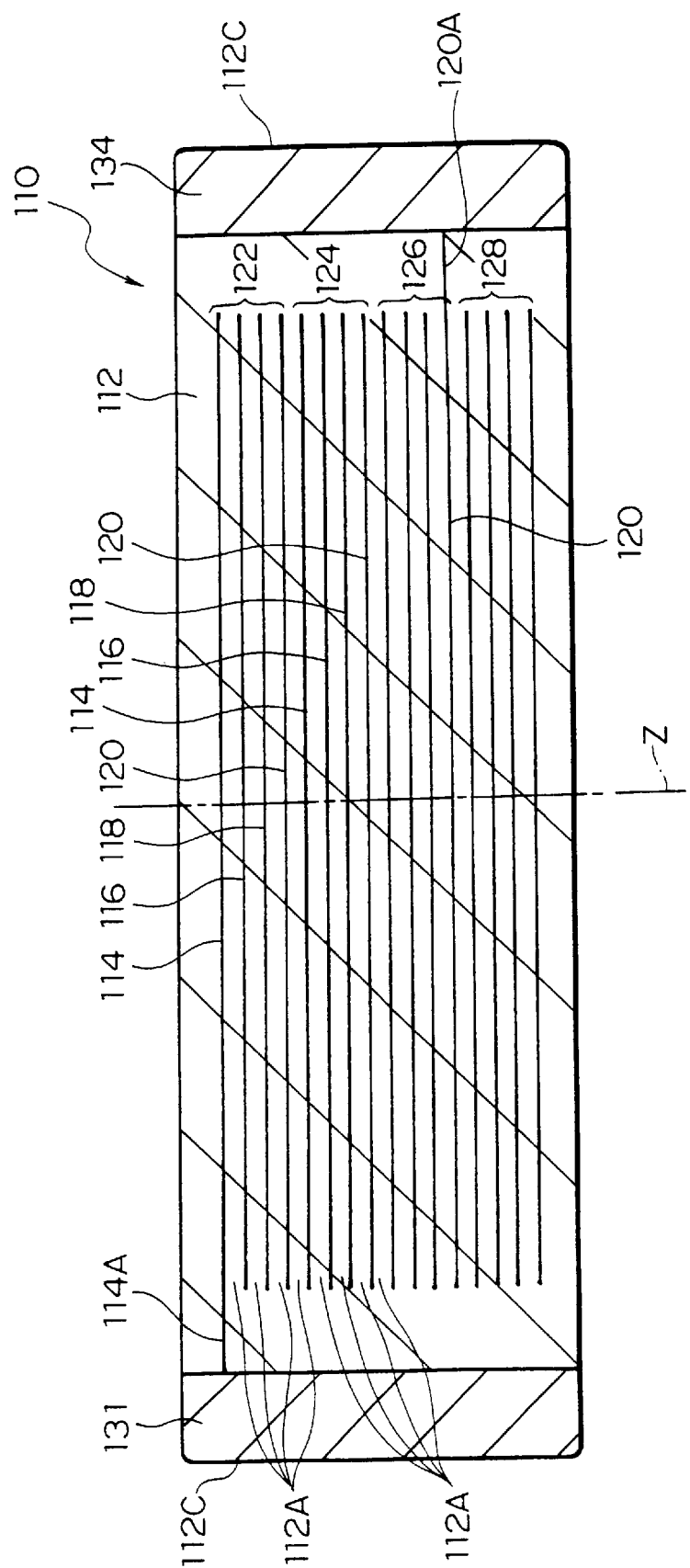
FIG. 11 is a sectional view of a multiterminal multilayer capacitor according to another embodiment of the present invention taken along the line XI—XI of FIG. 13.
Figure 12:
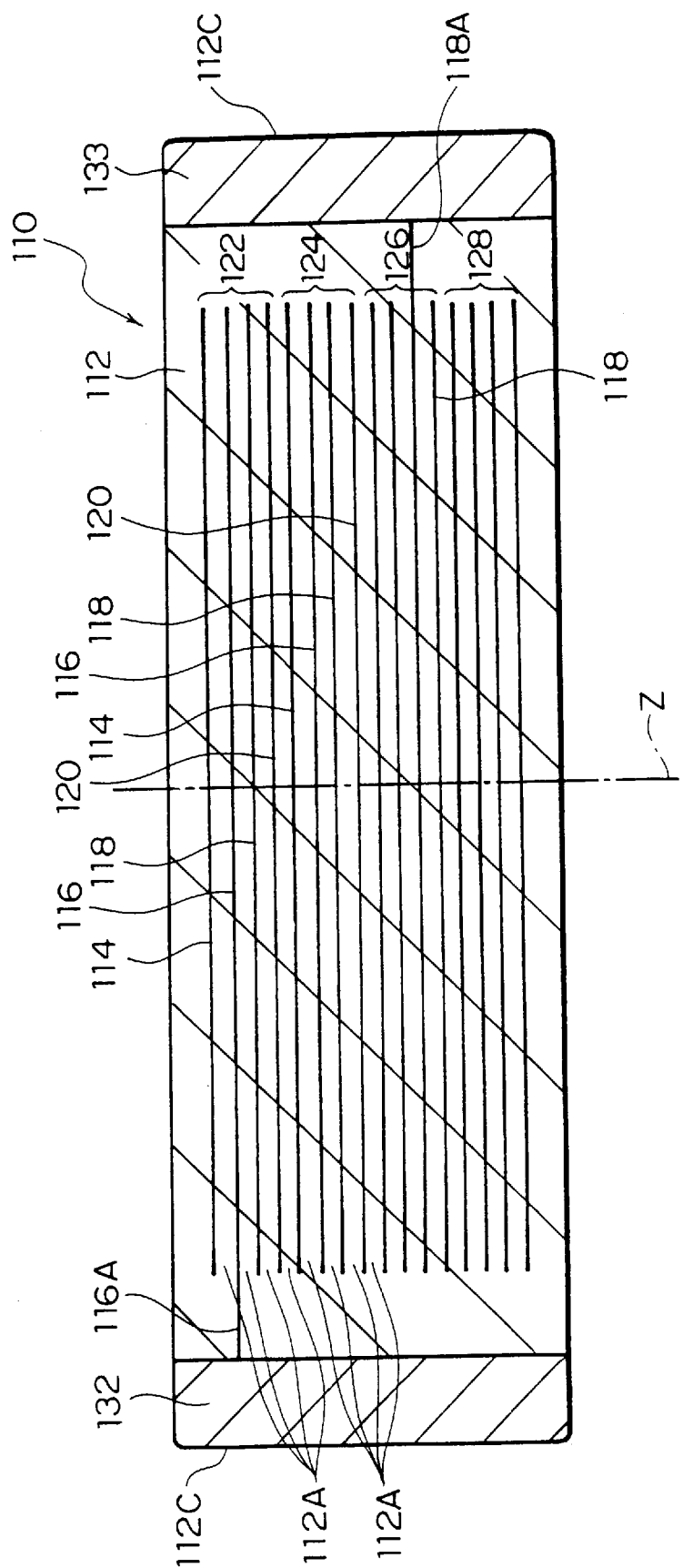
FIG. 12 is a sectional view of the multiterminal multilayer capacitor according to the another embodiment of the present invention taken along the line XII—XII of FIG. 13.
Figure 13:
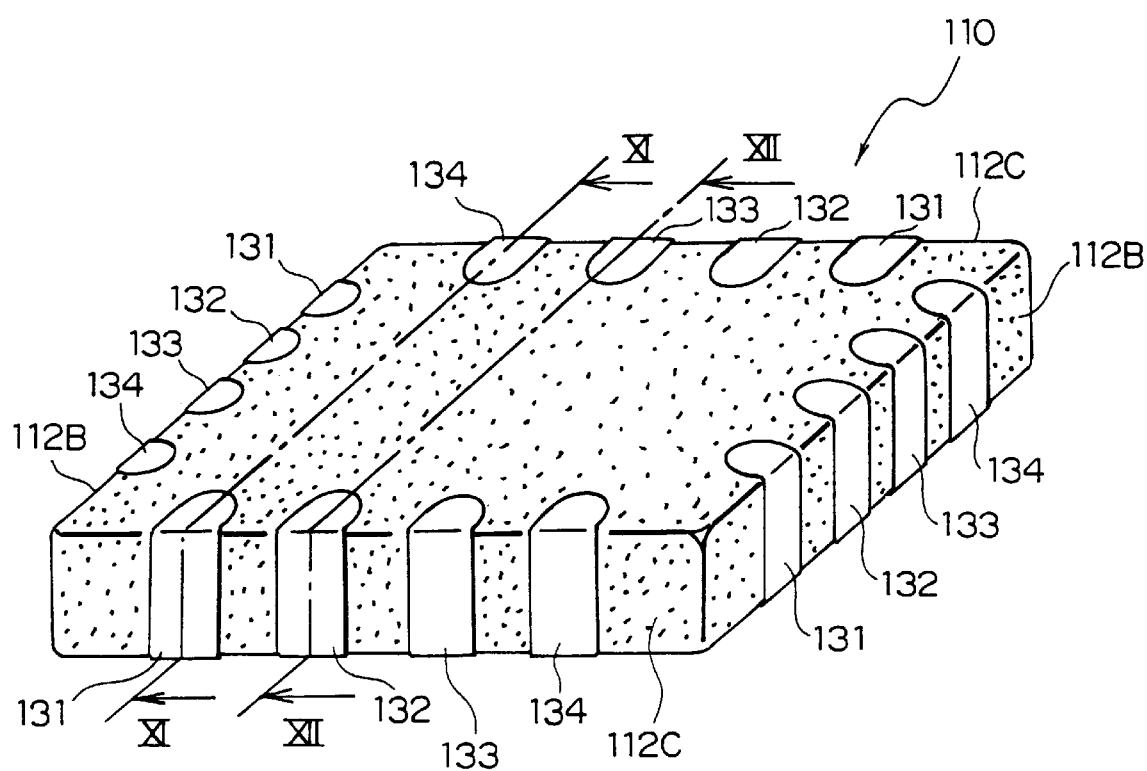
FIG. 13 is a perspective view of the multiterminal multilayer capacitor according to the another embodiment of the present invention.

Further, as shown in FIG. 11 to FIG. 13, in the first block 122, the first terminal electrode 131 connected to the lead 114A of the internal electrode 114, the second terminal electrode 132 connected to the lead 116A of the internal electrode 116, the third terminal electrode 133 connected to the lead 118A of the internal electrode 118, and the fourth terminal electrode 134 connected to the lead 120A of the internal electrode 120 are arranged at the illustrated front side face 112C of the capacitor body 112.

That is, since the lead 114A of the first internal electrode 114 to the lead 120A of the fourth internal electrode 120 are positioned at the side face 112C of the internal electrodes of the front side illustrated in FIG. 14 without overlapping, the adjoining terminal electrodes 131 to 134 are successively connected to different internal electrodes 114, 116, 118, and 120 through the leads 114A to 120A, for example, the adjoining terminal electrodes can be used at opposite polarities.

Further, in the same way as the first block 122, these terminal electrodes 131 to 134 are arranged at the right side face 112B of the capacitor body 112 corresponding to the second block 124, the terminal electrodes 131 to 134 are arranged at the illustrated rear side face 112C of the capacitor body 112 corresponding to the third block 126, and the terminal electrodes 131 to 134 are arranged at the left side face 112B of the capacitor body 112 corresponding to the fourth block 128.

Due to the above, in the present embodiment, the terminal electrodes 131 to 134 are arranged at the four side faces 112B and 112C of the capacitor body 112 made the rectangular parallelopiped, that is, the hexagonal shape, of the multiterminal multilayer capacitor 110.

Next, an explanation will be given of the method of production of the multiterminal multilayer capacitor 110 according to the present embodiment with reference to FIG. 14.

First, when producing the multiterminal multilayer capacitor 110, a plurality of ceramic green sheets 130A, 130B, 130C, and 130D comprised of dielectric materials functioning as capacitors is provided.

To form the internal electrodes 114, 116, 118, and 120 each having one lead 114A, 116A, 118A, and 120A led out, electrode portions of patterns corresponding to these internal electrodes 114, 116, 118, and 120 are provided by printing or depositing a conductive paste. Next, ceramic green sheets 130A to 130D having rectangular planar shapes are stacked in the order of the figure to form at least four blocks of the same structure.

Next, a block is rotated so that the leads 114A, 116A, 118A, and 120A are led out in the illustrated front direction of FIG. 14. That block is designated the first block 122.

Next, a block of the same structure is arranged below the first block 122 in a state rotated 90 degrees with respect to the first block 122 around the Z-axis orthogonal to the planes formed by the internal electrodes 114 to 120 so that the leads 114A, 116A, 118A, and 120A are led out in the right direction of FIG. 14. The block arranged below the first block 122 is designated the second block 124.

Similarly, a block of the same structure is arranged below the second block 124 in a state rotated 180 degrees with respect to the first block 122 around the Z-axis orthogonal to the planes formed by the internal electrodes 114 to 120 so that the leads 114A, 116A, 118A, and 120A are led out in the illustrated rear direction of FIG. 14. The block arranged below the second block 124 is designated the third block 126.

Similarly, a block of the same structure is arranged below the third block 126 in a state rotated 270 degrees with respect to the first block 122 around the Z-axis orthogonal to the planes formed by the internal electrodes 114 to 120 so that the leads 114A, 116A, 118A, and 120A are led out in the left direction of FIG. 14. The block arranged below the third block 126 is designated the fourth block 128.

Next, the plurality of blocks 122 to 128 are stacked in the state with different rotational positions as explained above to form the hexagonal shaped capacitor body.

Further, the first terminal electrode 131 connected to the lead 114A of the internal electrode 114, the second terminal electrode 132 connected to the lead 116A of the internal electrode 116, the third terminal electrode 133 connected to the lead 118A of the internal electrode 118, and the fourth terminal electrode 134 connected to the lead 120A of the internal electrode 120 are arranged around the stacked ceramic green sheets.

Further, the top face of the first internal electrode 114 and the portions between the terminal electrodes 131 to 134 are covered by the same material as the ceramic green sheets which is cofired. As a result, it is possible to obtain a multiterminal multilayer capacitor 110 where these ceramic green sheets become ceramic layers 112A and where four terminal electrodes 131 to 134 each are arranged at all of the four side faces 112B and 112C of the hexagonal capacitor body 112. Further, when mass producing the multiterminal multilayer capacitor 110, it is possible to prepare a large number of the above blocks in advance and therefore produce a large number of products by the above steps.

Next, the action of the present embodiment will be explained.

The four internal electrodes 114 to 120 separated by the ceramic layers 112A are arranged stacked in the hexagonal ceramic body 112 formed by stacking ceramic layers 112A. One lead 114A to 120A each is led out from these four internal electrodes 114 to 120 by different patterns. Further, these four internal electrodes 114 to 120 are designated as a block and a plurality of these blocks are formed. Four blocks 122 to 128 are stacked in a state with the blocks rotated to different rotational positions about the Z-axis orthogonal to the planes formed by the internal electrodes 114 to 120.

Further, four terminal electrodes 131 to 134 each are arranged at the four side faces of the hexagonal capacitor body 112. These terminal electrodes 131 to 134 are connected to any of the internal electrodes 114 to 120 through the leads 114A to 120A.

As a result, when supplying current to the multiterminal multilayer capacitor 110 according to the present embodiment, the four internal electrodes 114 to 120 of the blocks connected to the outside circuits through the leads 114A to 120A form electrodes of a capacitor arranged in parallel facing each other.

Further, in the present embodiment, the four internal electrodes 114 to 120 are made one block and four blocks 122 to 128 are stacked in the state at different rotational positions. Therefore, even in a multiterminal multilayer capacitor 110 of a structure having 16 internal electrodes 114 to 120 as in the present embodiment, by stacking four blocks of the same structure, there is no longer a need to fabricate internal electrodes 114 to 120 with different patterns of leads 114A to 120A for the number of the internal electrodes 114 to 120, so the production process becomes simplified and the manufacturing costs are reduced.

Further, in the present embodiment, not only is a capacitor body 112 formed in the most easily produced hexagonal shape as the multiterminal multilayer capacitor 110, but terminal electrodes 131 to 134 are arranged at the four side faces of the hexagonal shape. Therefore, since four blocks having four internal electrodes 114 to 120 can be arranged, even with this, a multiterminal multilayer capacitor 110 is obtained having a large number of internal electrodes 114 to 120 while simplifying the production process.

Further, in the present embodiment, four terminal electrodes 131 to 134 are arranged at the four side faces 112B and 112C of the hexagonal capacitor body 112. Further, these terminal electrodes 131 to 134 adjoining each other in the same side faces 112B and 112C are connected to different internal electrodes 114 to 120 through the single leads 114A to 120A led out by different patterns from the four internal electrodes 114 to 120.

Therefore, in the multiterminal multilayer capacitor 110 of this structure, when high frequency currents alternating in polarity so that the polarities of the adjoining terminal electrodes among the terminal electrodes 131 to 134 become different flow to the terminal electrodes 131 to 134, currents flow in opposite directions in the adjoining leads, so the effect of cancellation of the magnetic fluxes arises at these four side faces 112B and 112C, the parasitic inductance of the multiterminal multilayer capacitor 110 itself becomes smaller, and the ESL is reduced.

On the other hand, by providing single leads 114A to 120A connected to the terminal electrodes 131 to 134 led out from portions of the internal electrodes 114 to 120 giving the electrostatic capacities, the currents flow concentratedly at the single leads and the electrical resistances at the leads 114A to 120A can be increased. Further, as a result of the increase of the electrical resistances at the leads 114A to 120A in this way, even if the ESL reduction technology is employed for supplying positive and negative currents in opposite directions between adjoining leads to cancel out the magnetic fluxes, the ESR can be prevented from becoming excessively small.

On the other hand, in the present embodiment, since four capacitors are substantially included in a single multiterminal multilayer capacitor 110 in the above way, the number of multiterminal multilayer capacitors 110 is reduced, so the manufacturing costs are reduced and the space taken up can be reduced as required along with the increasing integration of circuits.

Next, results of tests conducted to compare the ESL and ESR between the multiterminal multilayer capacitor 110 according to the present embodiment and another capacitor will be shown. Further, the other capacitor compared with here is a multiterminal multilayer capacitor reduced in ESL by being provided with four leads for one internal electrode and has the same 16 internal electrodes as the multiterminal multilayer capacitor 110 of the present embodiment. Further, the electrostatic capacity used in the tests is 1 $\mu$F.

As a result of the tests, the ESL of the conventional reduced ESL multiterminal multilayer capacitor was found to be 126 pH and the ESR was found to be 2.4 m$\Omega$. As opposed to this, the ESL of the multiterminal multilayer capacitor 110 according to the present embodiment was found to be 30 pH and the ESR was found to be 9.8 m$\Omega$.

That is, not only is the ESL of the multiterminal multilayer capacitor 110 of the present embodiment smaller than the conventional multiterminal multilayer capacitor, the ESR of the multiterminal multilayer capacitor 110 of the present embodiment became about four times larger than the conventional multiterminal multilayer capacitor.

This is believed to be because while the ESR of the conventional capacitor was about R/16 from the model of the ESR shown in FIG. 15A, the ESR of the multiterminal multilayer capacitor 110 of the present embodiment was about R/4 from the model of the ESR shown in FIG. 15B. Further, in FIG. 15A and FIG. 15B, "R" shows the electrical resistances at the leads.

Figure 16B:
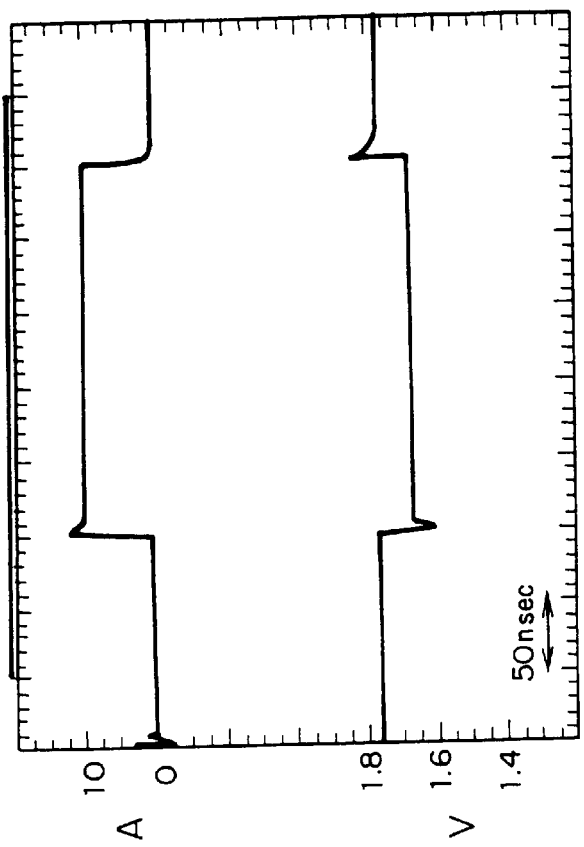
FIG. 16B is a graph of the relationship between current and voltage of a multiterminal multilayer capacitor of an embodiment.
Figure 16A:
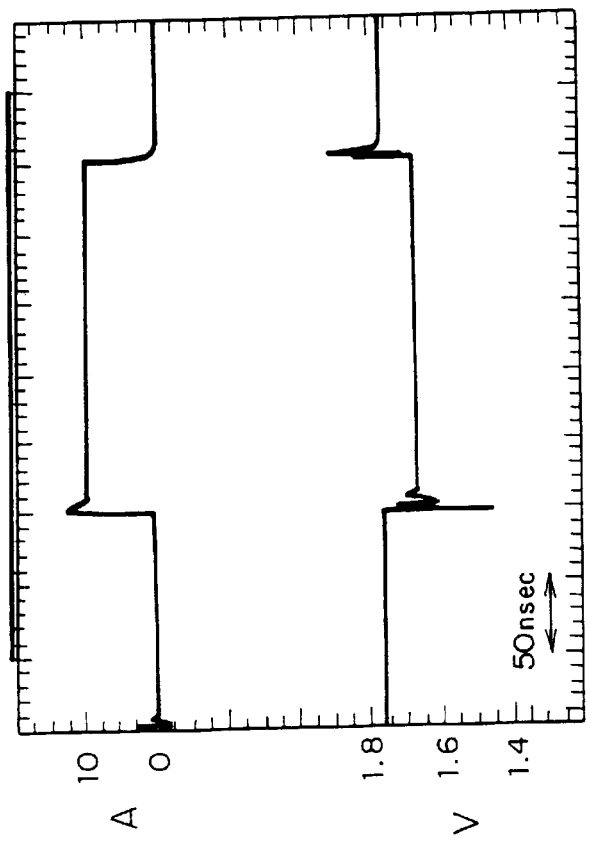
FIG. 16A is a graph of the relationship between current and voltage in a model of a power supply circuit of an LSI showing the relationship of current and voltage of a conventional capacitor.

Further, a comparison of the voltage fluctuations of the power supply circuit accompanying sharp current fluctuations is shown in FIGS. 16A and 16B. That is, while the conventional capacitor shown in FIG. 16A suffered from a large voltage fluctuation, the multiterminal multilayer capacitor 110 of the present embodiment shown in FIG. 16B has a far smaller voltage fluctuation as a result of the larger ESR and the power supply circuit is stabilized.

Next, an example of use of the multiterminal multilayer capacitor 110 according to the present embodiment will be explained based on FIG. 17.

Figure 17:
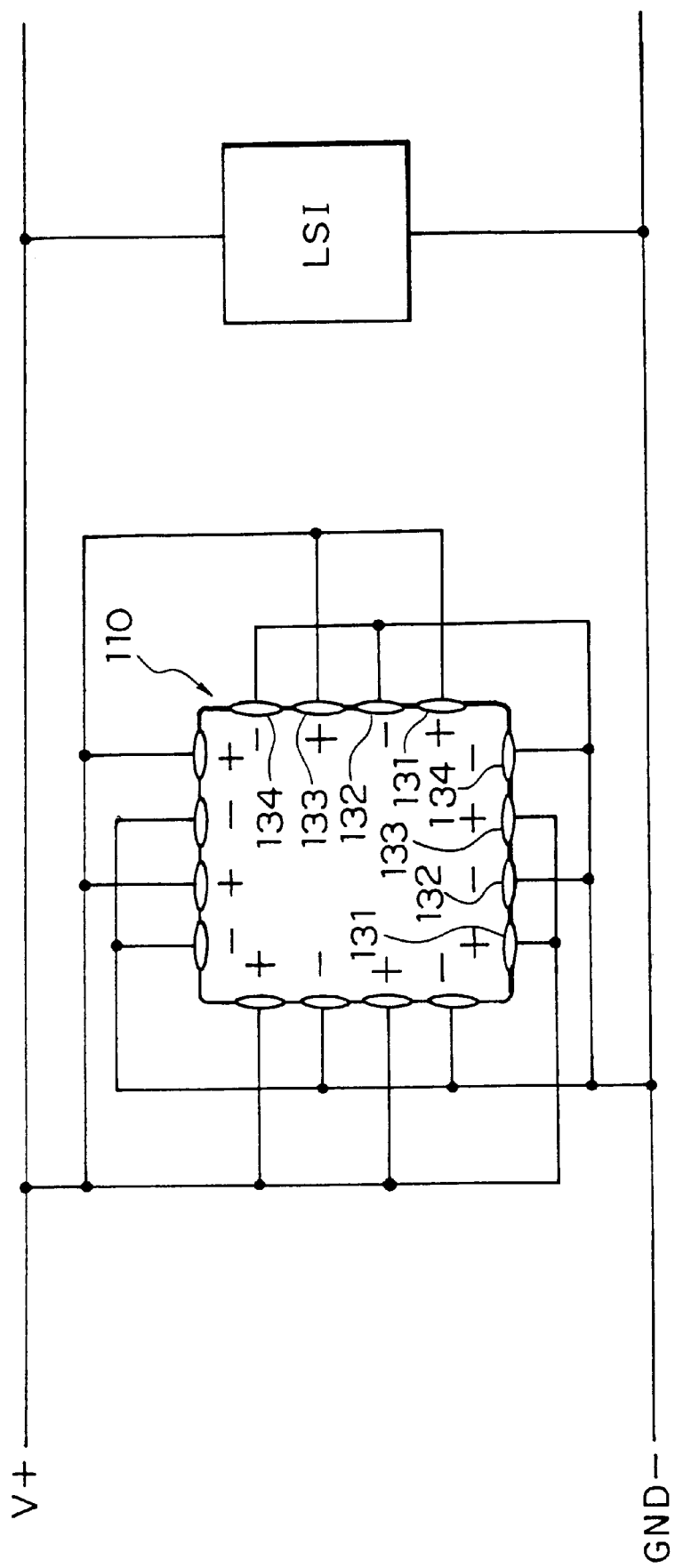
FIG. 17 is a view of the state of use of the multiterminal multilayer capacitor according to the present embodiment.
Figure 18:
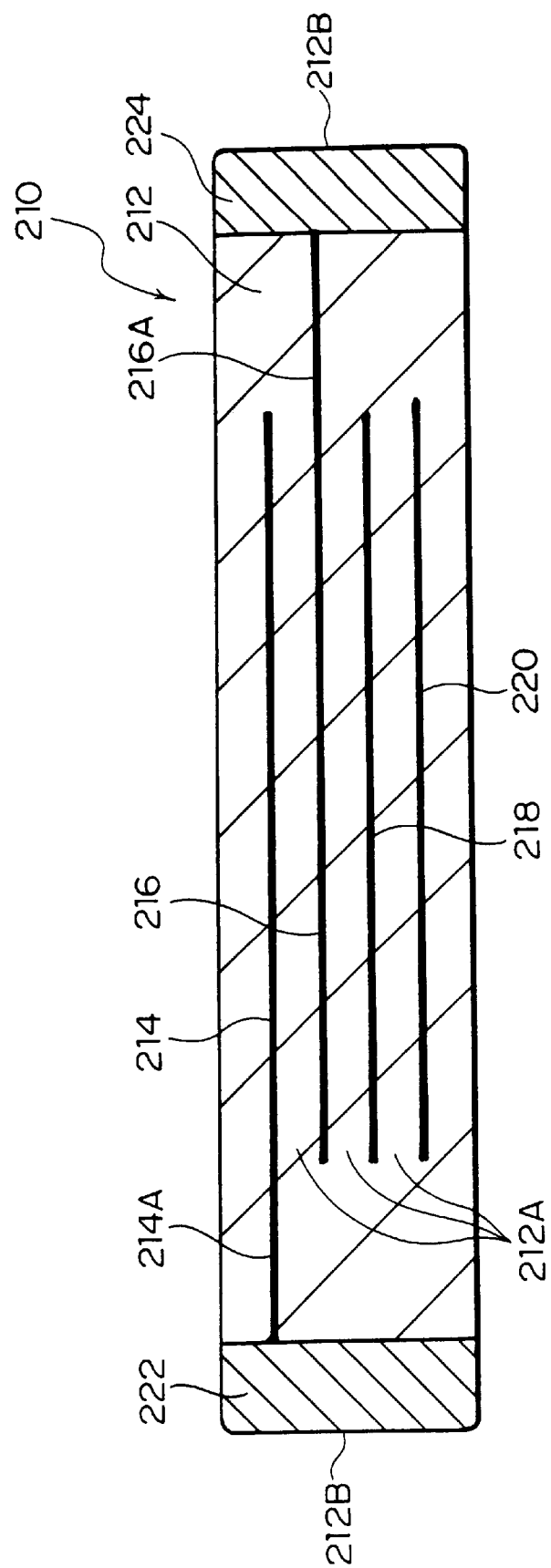
FIG. 18 is a sectional view of a multiterminal multilayer capacitor according to another embodiment of the present invention taken along the line XVIII—XVIII of FIG. 20.
Figure 19:
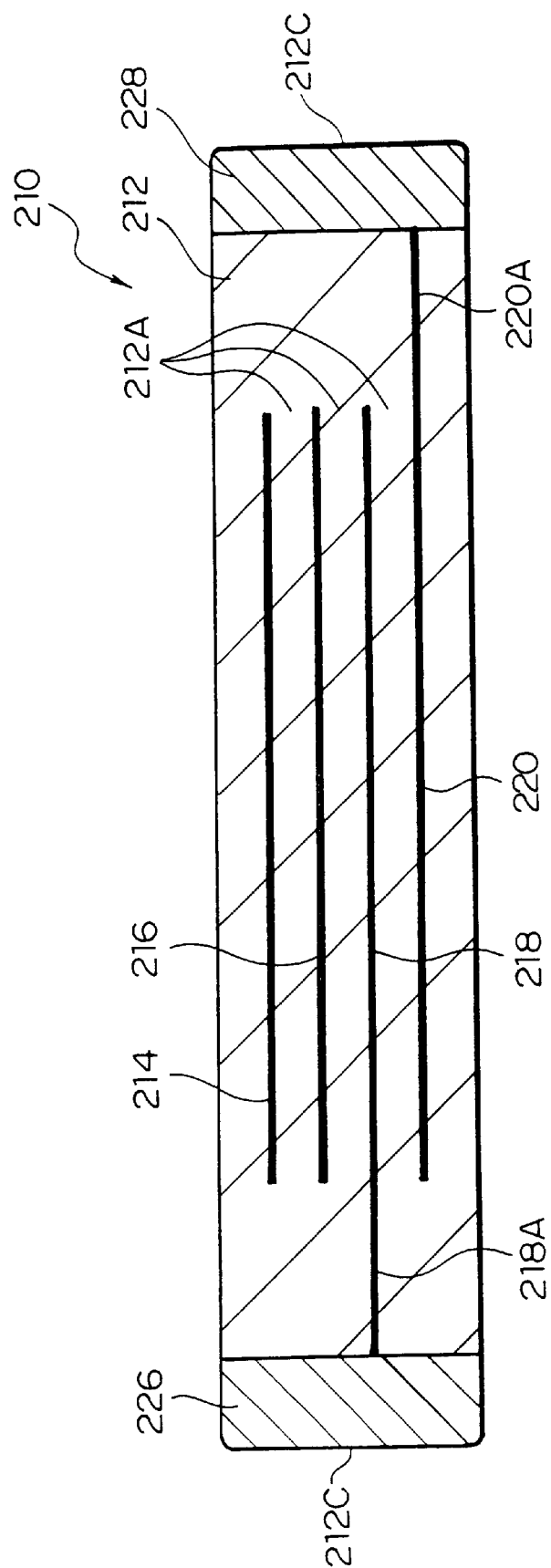
FIG. 19 is a sectional view of the multiterminal multilayer capacitor according to the another embodiment of the present invention taken along the line XIX—XIX of FIG. 20.
Figure 20:
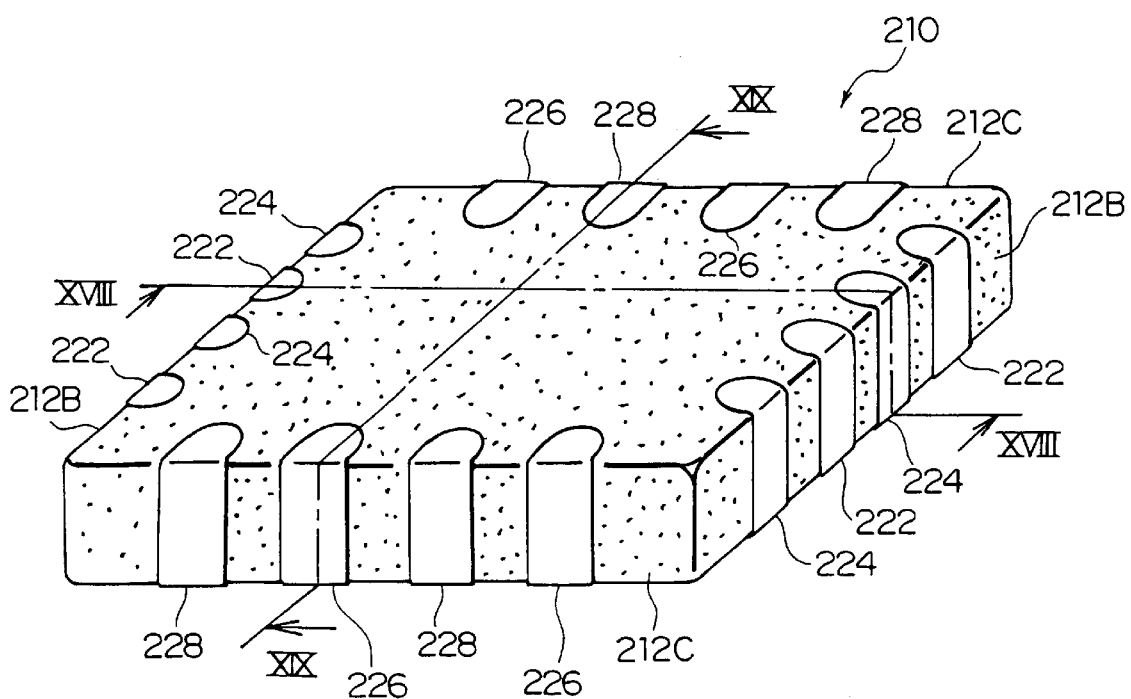
FIG. 20 is a perspective view of the multiterminal multilayer capacitor according to this embodiment.
Figure 21:
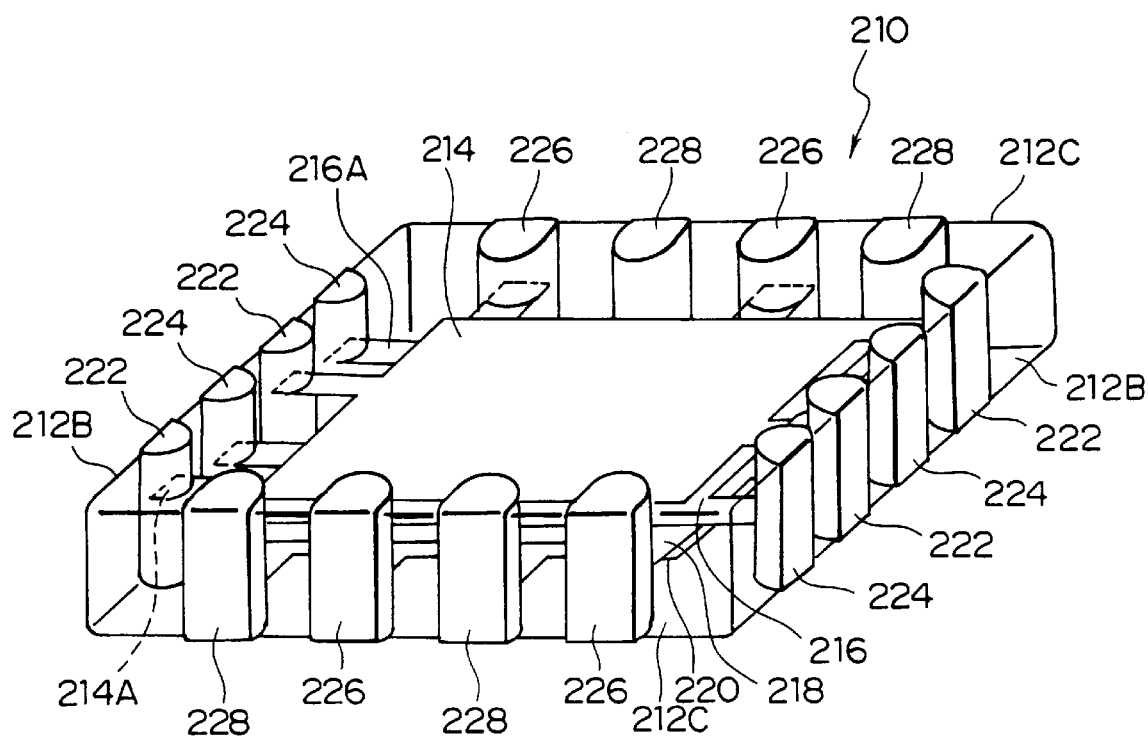
FIG. 21 is a perspective view of the multiterminal multilayer capacitor according to this embodiment.

As shown in FIG. 17, the multiterminal multilayer capacitor 110 of the present embodiment is arranged in parallel with the LSI chip between the ground terminal GND and a terminal "V" having a predetermined potential. The adjoining terminal electrodes among the terminal electrodes 131 to 134 arranged at the four side faces of the multiterminal multilayer capacitor 110 are connected to become opposite polarities as explained above. These four internal electrodes 114 to 120 constitute one capacitor.

If however the terminal electrodes 131 to 134 positioned at one side face of the multiterminal multilayer capacitor 110 in FIG. 17 and the internal electrodes 114 to 120 connected to these terminal electrodes 131 to 134 constitute one capacitor, four capacitors are constituted by these four side faces, so it is also possible to wire things so that four capacitors are connected to the LSI chip in parallel.

Further, while the multiterminal multilayer capacitor 110 according to the present embodiment is structured with 16 internal electrodes comprising the four internal electrodes 114 to 120 stacked four times, the number of the internal electrodes of the blocks is not limited to four. It is possible to provide two each for example, that is, four capacitors. Further, the overall number of the internal electrodes is not limited to 16. It is also possible to increase the number of blocks to further increase the number. Further, if structuring the capacitor with such a large number of internal electrodes, an even greater number of circuits can be dealt with.

Fourth Embodiment

A multilayer electronic device according to another embodiment of the present invention, that is, an array type multiterminal multilayer capacitor 210, is shown from FIG. 18 to FIG. 21. As shown in these figures, the multiterminal multilayer capacitor 210 is comprised of a main portion consisting of a rectangular parallelopiped sintered body obtained by stacking a plurality of ceramic green sheets for use as dielectric layers and firing the stack, that is, a capacitor body 210.

A planar first internal electrode 214 is arranged at a predetermined height position in the capacitor body 212. A similar planar second internal electrode 216 is arranged below the first internal electrode 214 separated by the ceramic layer 212A in the capacitor body 212.

A planar third internal electrode 218 is arranged below the second internal electrode 216 separated by the ceramic layer 212A in the capacitor body 212. A planar fourth internal electrode 220 is arranged below the third internal electrode 218 separated by the ceramic layer 212A in the capacitor body 212.

Therefore, the first internal electrode 214 to the fourth internal electrode 220 are arranged facing each other separated by ceramic layers 212A in the capacitor body 212. The center of these first internal electrode 214 to fourth internal electrode 220 is arranged to be at substantially the same position as the center of the capacitor body 212. Further, the longitudinal and lateral dimensions of the first internal electrode 214 to the fourth internal electrode 220 are made smaller than the length of the corresponding sides of the capacitor body 212.

Figure 22:
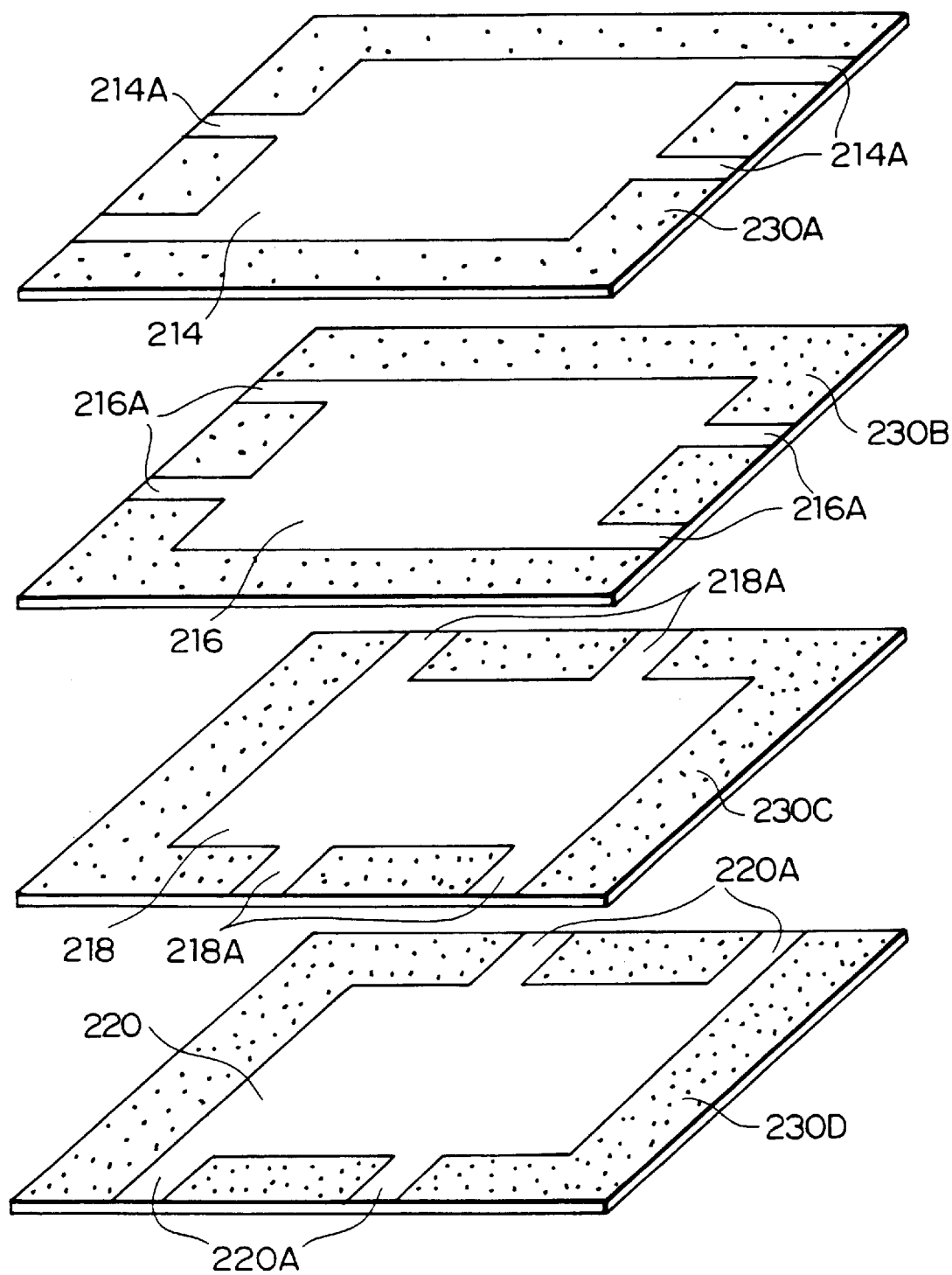
FIG. 22 is a disassembled perspective view of a plurality of ceramic green sheets and electrode shapes used in the process of production of the multiterminal multilayer capacitor of this embodiment.

Further, as shown in FIG. 22, by leading out two electrodes each to the left and right directions of the first internal electrode 214, two pairs of leads 213A are formed at the first internal electrode 214. Further, by leading out two electrodes each to the left and right directions of the second internal electrode 216 at positions not overlapping with the first internal electrode 214, two pairs of leads 216A are formed at the second internal electrode 216.

On the other hand, by leading out two electrodes each toward the top and bottom directions of the third internal electrode 218, two pairs of leads 218A are formed at the third internal electrode 218. Further, by leading out two electrodes each toward the top and bottom directions of the fourth internal electrode 220 at positions not overlapping the third internal electrode 218, two pairs of leads 220A are formed at the fourth internal electrode 220.

Due to the above, the leads 214A and 216A are led out from the internal electrodes 214 and 216 toward the two facing side faces 212B of the capacitor body 212 in the state with the facing internal electrodes 214 and 216 led out reversed 180 degrees. Further, the leads 218A and 220A are led out from the internal electrodes 218 and 220 toward the two facing side faces 212C of the capacitor body 212 differing from the direction of lead out of the internal electrodes 214 and 216 in the state with the facing internal electrodes 218 and 220 led out reversed 180 degrees.

Further, as shown in FIG. 18 to FIG. 21, the first terminal electrode 222 connected to the lead 214A of the internal electrode 214 and the second terminal electrode 224 connected to the lead 216A of the second internal electrode 216 are arranged at the left and right side faces 212B of the capacitor body 212. Further, the third terminal electrode 226 connected to the lead 218A of the third internal electrode 218 and the fourth terminal electrode 228 connected to the lead 220A of the fourth internal electrode 220 are arranged at the top and bottom faces 212C of the capacitor body 212.

Further, since the lead 214A of the first internal electrode 214 and the lead 216A of the second internal electrode 216 are positioned alternately without overlapping each other, the adjoining terminal electrodes 222 and 224 are arranged at the side faces 212B of the capacitor body 212 in a manner with the terminal electrodes 222 and 224 connected to the mutually different internal electrodes 214 and 216.

Further, since the lead 218A of the third internal electrode 218 and the lead 220A of the fourth internal electrode 220 are positioned alternately without overlapping, the terminal electrodes 226 and 228 are arranged at the side faces 212C of the capacitor body 212 in a form with the adjoining terminal electrodes 226 and 228 connected to the mutually different internal electrodes 218 and 220 through the leads 218A and 220A.

Due to the above, in the present embodiment, four each of the terminal electrodes 222, 224, 226, and 228 are arranged at four faces of the six faces of the multiterminal multilayer capacitor 210 made the rectangular parallelopiped, that is, the hexagonal shape.

Next, an explanation will be given of the method of production of the multiterminal multilayer capacitor 210 according to the present embodiment with reference to FIG. 22.

As shown in FIG. 22, to form the first internal electrode 214 having two leads 214A each in the left and right directions, for example a conductive paste is printed or deposited on the top face of the ceramic green sheet 230A in accordance with the pattern of the first internal electrode 214. To form the second internal electrode 216 having two leads 216A each in the left and right directions on the top face of the ceramic green sheet 230B positioned below the ceramic green sheet 230A, for example the conductive paste is printed or deposited in accordance with the pattern of the second internal electrode 216.

Further, to form the third internal electrode 218 having two leads 218A each in the top and bottom direction on the top face of the ceramic green sheet 230C positioned below the ceramic green sheet 230B, a conductive paste is printed or deposited in the same way in accordance with the pattern of the third internal electrode 218. To form the fourth internal electrode 220 having two leads 220A each in the top and bottom direction on the top face of the ceramic green sheet 230D positioned below the ceramic green sheet 230C, a conductive paste is printed or deposited in the same way in accordance with the pattern of the fourth internal electrode 220.

Further, the ceramic green sheets 230A, 230B, 230C, and 230D with rectangular planar shapes are stacked and the first terminal electrode 222 connected to the lead 214A of the first internal electrode 214, the second terminal electrode 224 connected to the lead 216A of the second internal electrode 216, the third terminal electrode 226 connected to the lead 218A of the third internal electrode 218, and the fourth terminal electrode 228 connected to the lead 220A of the fourth internal electrode 220 are arranged around the stacked ceramic green sheets.

Further, the top face of the first internal electrode 214 and the portions between the terminal electrodes 222, 224, 226, and 228 are covered by the same material as the ceramic green sheets which are then cofired. As a result, it is possible to obtain a multiterminal multilayer capacitor 210 where the terminal electrodes 222, 224, 226, and 228 are arranged at the four side faces 212B and 212C of the capacitor body 212.

Next, the action of the multiterminal multilayer capacitor 210 according to the present embodiment will be explained.

The four internal electrodes 214, 216, 218, and 220 separated by the ceramic layers 212A are arranged separated by the ceramic layers 212A in the ceramic body 212 formed by stacking ceramic or other dielectric layers. These four internal electrodes 214 to 220 have leads 214A, 216A, 218A, and 220A led out toward the two facing side faces of the capacitor body 212. The eight pairs, that is, the total 16, terminal electrodes 222, 224, 226, and 228 arranged outside the capacitor body 212 are connected to any of the four internal electrodes 214 to 220 through these leads 214A to 220A.

When these eight pairs of terminal electrodes 222, 224, 226, and 228 are supplied with current, they alternately become positive and negative polarities and the four internal electrodes 214 to 220 connected to the terminal electrodes 222 to 228 through the leads 214A to 220A form electrodes of capacitors arranged in parallel facing each other.

That is, the leads 214A and 216A are led out toward the two facing side faces 212B of the capacitor body 212, while the leads 218A and 220A are led out toward the two facing side faces 212C of the capacitor body 212. Therefore, currents flow straight by short routes at the time of carrying a current and the positive and negative currents intersect two-dimensionally to cancel out the magnetic fluxes among the four internal electrodes 214, 216, 218, and 220 in the multilayer electronic device 210. As a result, the parasitic inductance of the multilayer electronic device 210 itself is sharply reduced.

Due to the above, in the present embodiment, by reducing the parasitic inductance of the multiterminal multilayer capacitor 210 itself by the effect of cancellation of the magnetic fluxes, the ESL is reduced.

On the other hand, in the present embodiment, the capacitor body 212 is formed to a hexagonal shape, and the terminal electrodes 222, 224, 226, and 228 are arranged at the four side faces 212B and 212C of the hexagonal capacitor body 212 so that the adjoining terminal electrodes 222 and 224 at the side face 212B and the adjoining terminal electrodes 226 and 228 at the side face 212C are connected to the mutually different internal electrodes 214, 216, 218, and 220.

Therefore, since the terminal electrodes 222, 224, 226, and 228 are provided at the four side faces 212B and 212C of the hexagonal capacitor body 212, the routes over which the currents flow become the shortest. Further, when supplying high frequency currents to the terminal electrodes 222, 224, 226, and 228 so that the terminal electrodes 222, 224, 226, and 228 of the side faces 212B and 212C become alternately positive and negative, currents flow from the terminal electrodes 222, 224, 226, and 228 of the four side faces to the internal electrodes 214, 216, 218, and 220 along with the four internal electrodes 214, 216, 218, and 220 connected to the terminal electrodes 222, 224, 226, and 228 becoming positive and negative polarities and intersect and as a result the parasitic inductance further falls.

Further, the adjoining terminal electrodes 222, 224, 226, and 228 at the side faces of the capacitor body 212 are arranged connected to mutually different internal electrodes 214, 216, 218, and 220. Therefore, currents flow so that the polarities of the adjoining terminal electrodes 222, 224, 226, and 228 become mutually different and the effect of the magnetic fluxes created canceling each other out due to the high frequency currents flowing in the internal electrodes 214, 216, 218, and 220 in mutually opposite directions is further enhanced.

Next, a more detailed explanation will be given of the flow of currents in the multiterminal multilayer capacitor 210 according to the present embodiment using FIG. 23.

Figure 23:
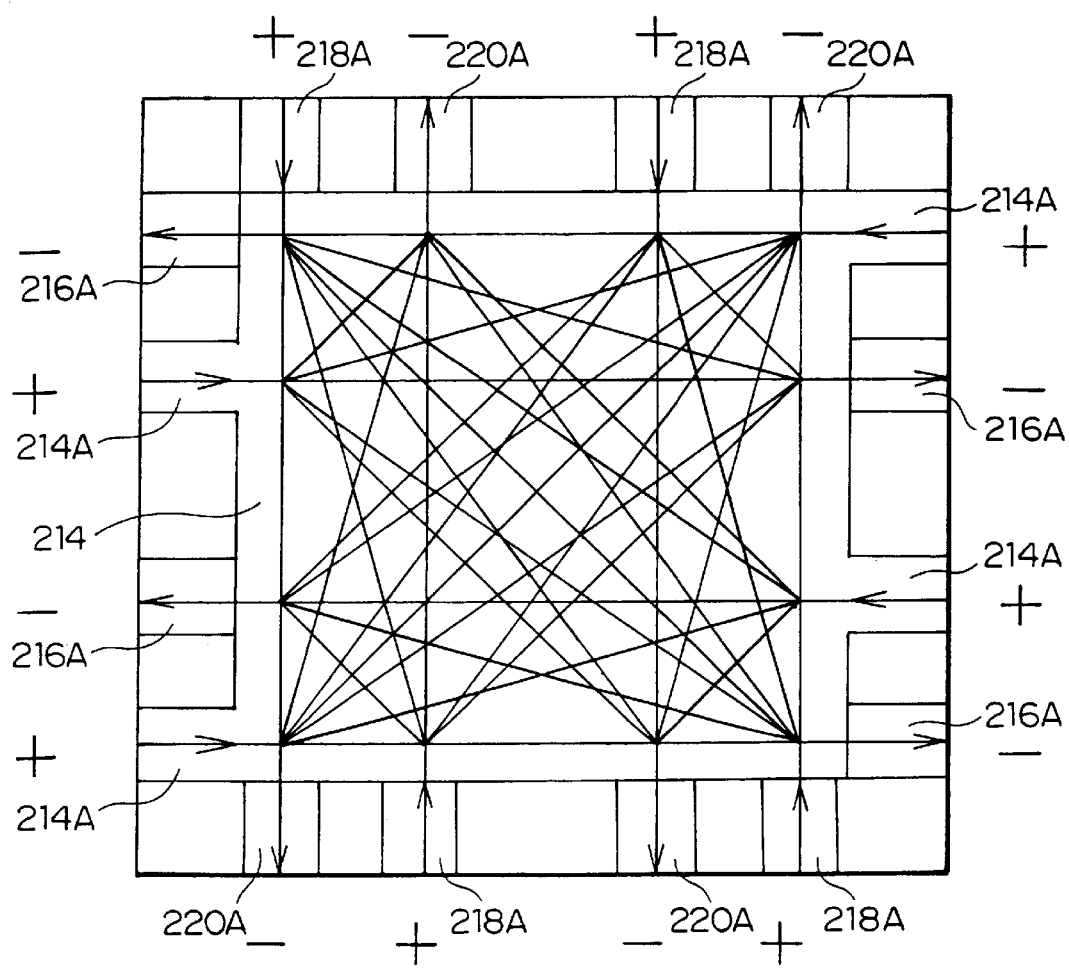
FIG. 23 is a view explaining the flow of current in the multiterminal multilayer capacitor according to this embodiment.

As shown in FIG. 23 which shows the state of the four internal electrodes 214, 216, 218, and 220 overlaid, the currents flow from the terminal electrodes 222 and 226 through the leads 214A and 218A into the internal electrodes 214 and 228 at the illustrated times and then flow through the leads 216A and 220A from the terminal electrodes 224 and 228 outside of the internal electrodes 216 and 220. In the case of high frequency currents, however, they become opposite the next instant. Further, when current flows, magnetic fluxes determined in direction by the direction of the current are induced and a parasitic inductance arises.

In the multiterminal multilayer capacitor 210 according to the present embodiment, however, as shown in FIG. 23, the current flowing in from the leads 214A and 218A of the internal electrodes 214 and 218 spreads to a large angle and the currents gathered at the large angles flow out from the leads 216A and 220A of the internal electrodes 216 and 220.

That is, since currents flow in various directions, the majority of the magnetic fluxes induced due to currents is canceled out between adjoining internal electrodes and therefore a large magnetic flux is not generated. Therefore, the parasitic inductance becomes smaller and along with this the ESL is reduced.

Next, results of tests conducted to compare the ESL and ESR between the multiterminal multilayer capacitor 210 according to the present embodiment and another capacitor will be shown.

The ESL of the ordinary 3216 type multiterminal multilayer capacitor was found to be 1250 pH and the ESL of the conventional multiterminal multilayer capacitor was found to be 105 pH, while the ESL of the multiterminal multilayer capacitor according to the present embodiment was found to be a small 75 pH. Further, the electrostatic capacities of the capacitors used for the tests were 1 $\mu$F. Further, the "3216 type" means a type of a size of a longitudinal 3.2 mm and a lateral 1.6 mm.

Next, an example of use of the multiterminal multilayer capacitor 210 according to the present embodiment will be explained based on FIG. 24.

Figure 24:
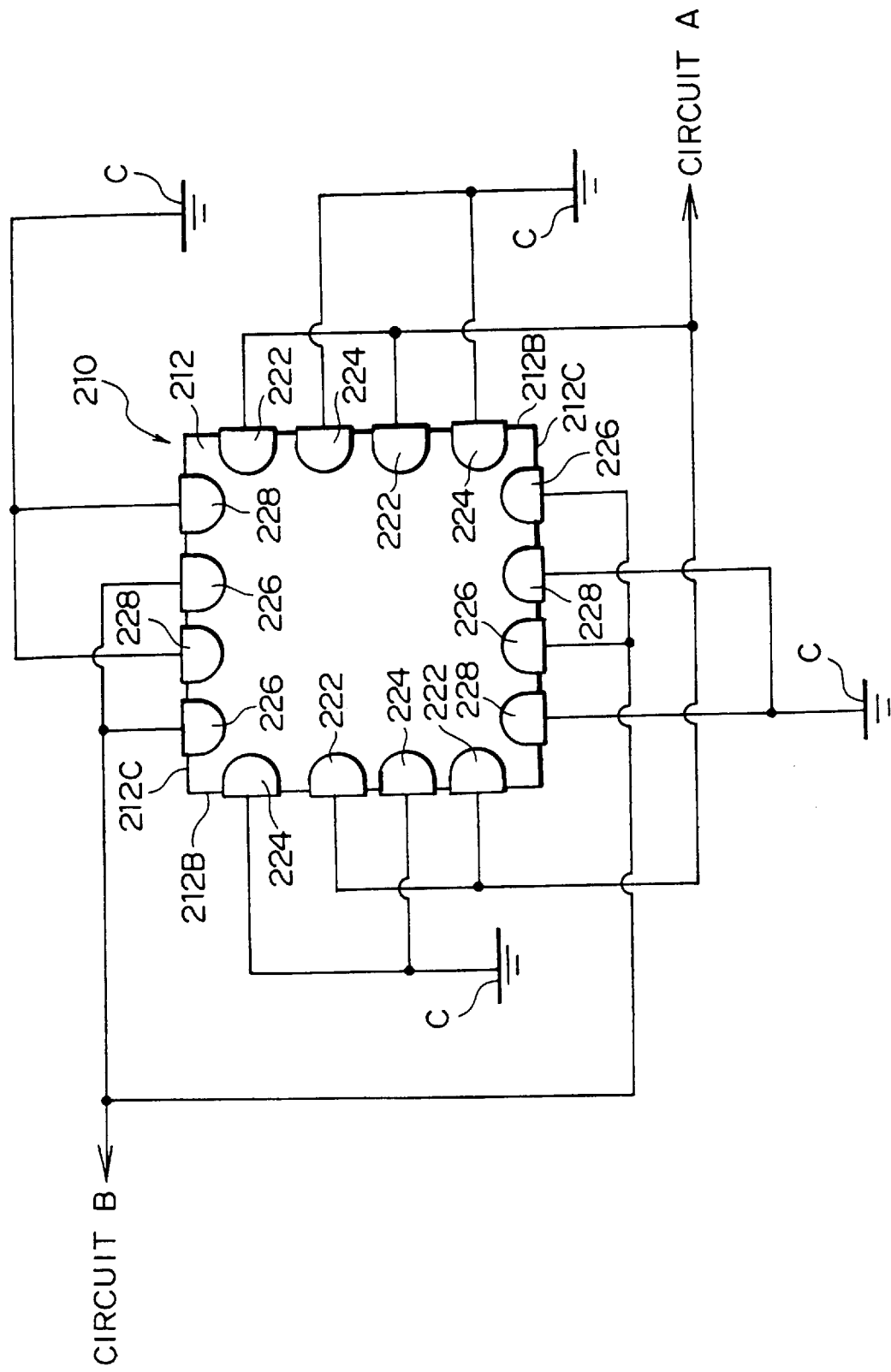
FIG. 24 is a view explaining the flow of current in a multiterminal multilayer capacitor according to a modification of this embodiment.

As shown in FIG. 24, the multiterminal multilayer capacitor 210 has a circuit B and four grounds C. By having the four first terminal electrodes 222 arranged at the two side faces 212B of the multiterminal multilayer capacitor 210 connected to the circuit A, the first internal electrode 214 is connected to the circuit A through the first terminal electrodes 222. Further, by having the four second terminal electrodes 224 arranged at the side faces 212B adjoining the first terminal electrodes 222, the second internal electrode 216 is connected to the ground C through the second terminal electrodes 224.

On the other hand, by having the four third terminal electrodes 226 arranged at the two side faces 212C of the multiterminal multilayer capacitor 210 connected to the circuit B, the third internal electrode 218 is connected to the circuit B through the third terminal electrodes 226. Further, by having the four fourth terminal electrodes 228 arranged at the side faces 212C adjoining the third terminal electrodes 226, the fourth internal electrode 220 is connected to the ground C through the fourth terminal electrodes 228.

That is, the multiterminal multilayer capacitor 210 according to the present embodiment is made a structure giving electrostatic capacities between the four internal electrodes 214, 216, 218, and 220, so by dividing each two internal electrodes for use as explained above, it becomes possible to handle two circuits.

Fifth Embodiment

Figure 25:
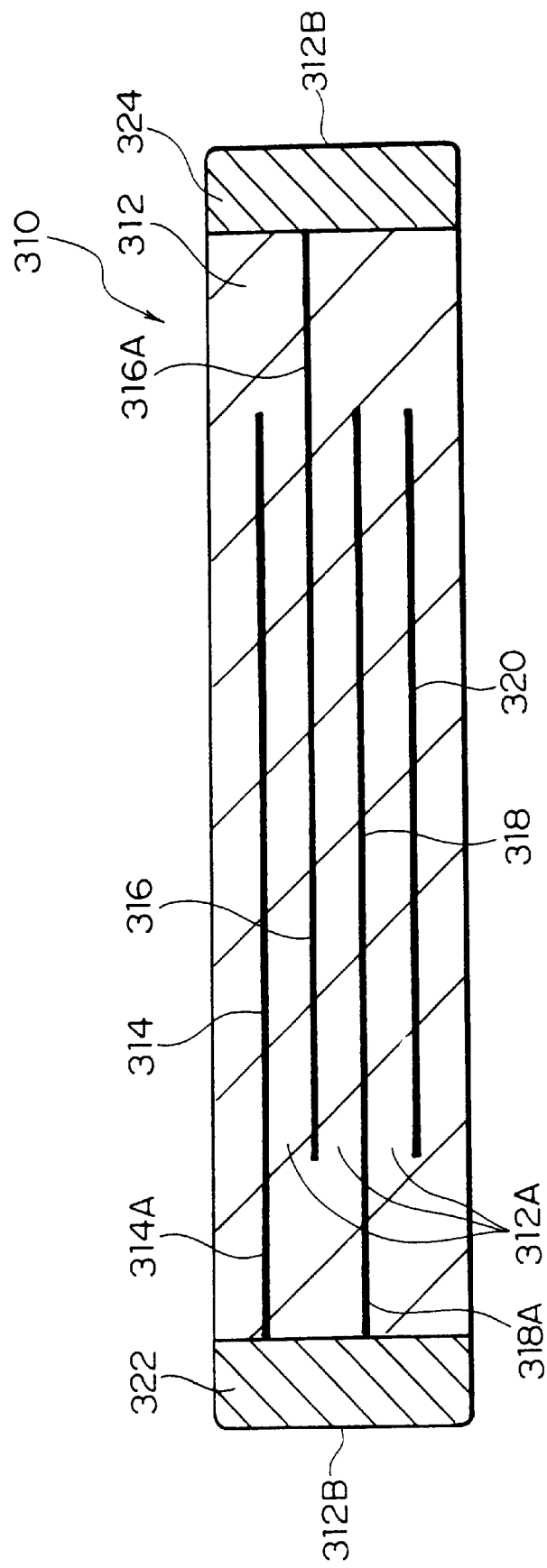
FIG. 25 is a sectional view of a multiterminal multilayer capacitor according to another embodiment of the present invention taken along the line IIXV—IIXV of FIG. 27.
Figure 26:
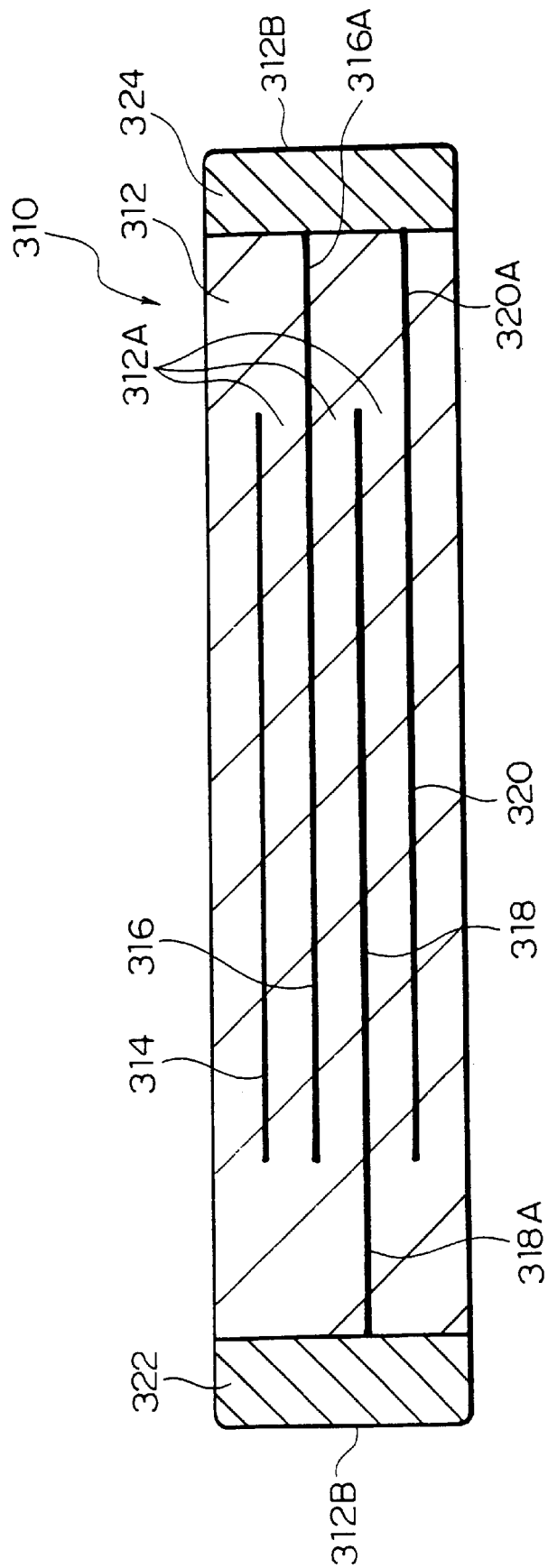
FIG. 26 is a sectional view of the multiterminal multilayer capacitor according to the embodiment of the present invention taken along the line IIXVI—IIXVI of FIG. 27.
Figure 27:
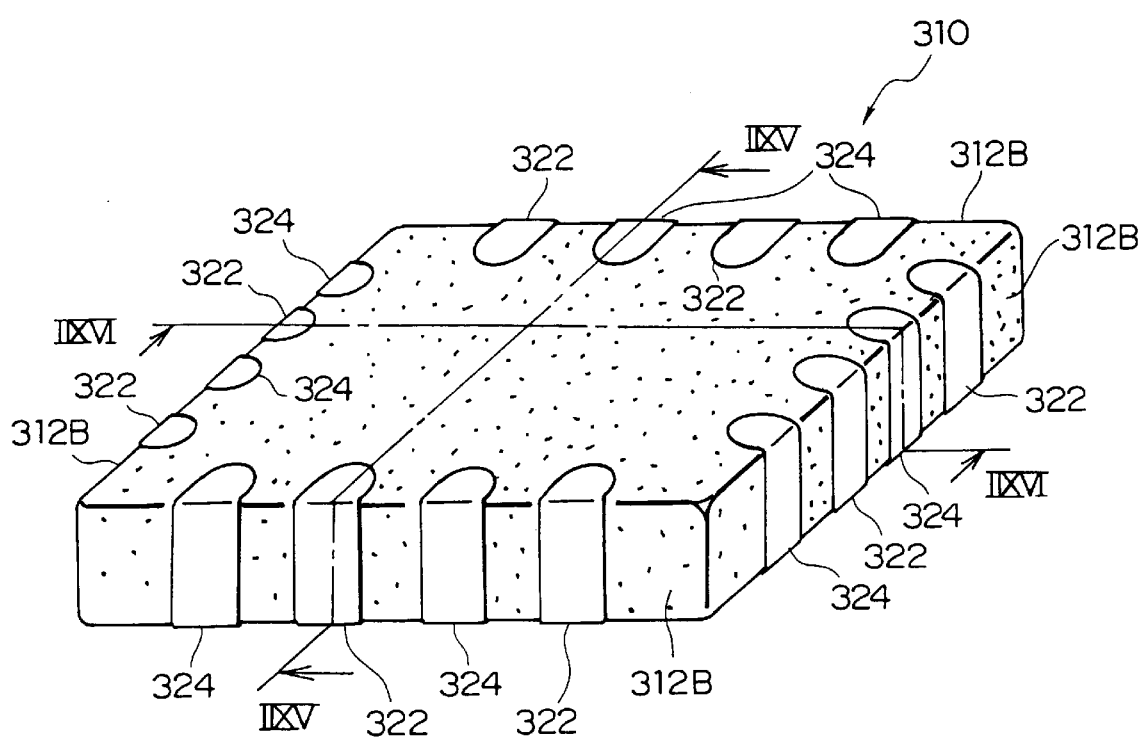
FIG. 27 is a perspective view of the multiterminal multilayer capacitor according to this embodiment.

A multilayer electronic device according to a fifth embodiment of the present invention, that is, an array type multiterminal multilayer capacitor 310, is shown from FIG. 25 to FIG. 27. As shown in these figures, the multiterminal multilayer capacitor 310 is comprised of a main portion consisting of a rectangular parallelopiped sintered body obtained by stacking a plurality of ceramic green sheets for use as dielectric layers and firing the stack, that is, a capacitor body 310.

A planar first internal electrode 314 is arranged at a predetermined height position in the capacitor body 312. A similar planar second internal electrode 316 is arranged below the first internal electrode 314 separated by the ceramic layer 312A in the capacitor body 312.

A planar third internal electrode 318 is arranged below the second internal electrode 316 separated by the ceramic layer 312A in the capacitor body 312. A planar fourth internal electrode 320 is arranged below the third internal electrode 318 separated by the ceramic layer 312A in the capacitor body 312.

Therefore, the first internal electrode 314 to the fourth internal electrode 320 are arranged facing each other separated by ceramic layers 312A in the capacitor body 312. The center of these first internal electrode 314 to fourth internal electrode 320 is arranged to be at substantially the same position as the center of the capacitor body 312. Further, the longitudinal and lateral dimensions of the first internal electrode 314 to the fourth internal electrode 320 are made smaller than the lengths of the corresponding sides of the capacitor body 312.

Figure 28:
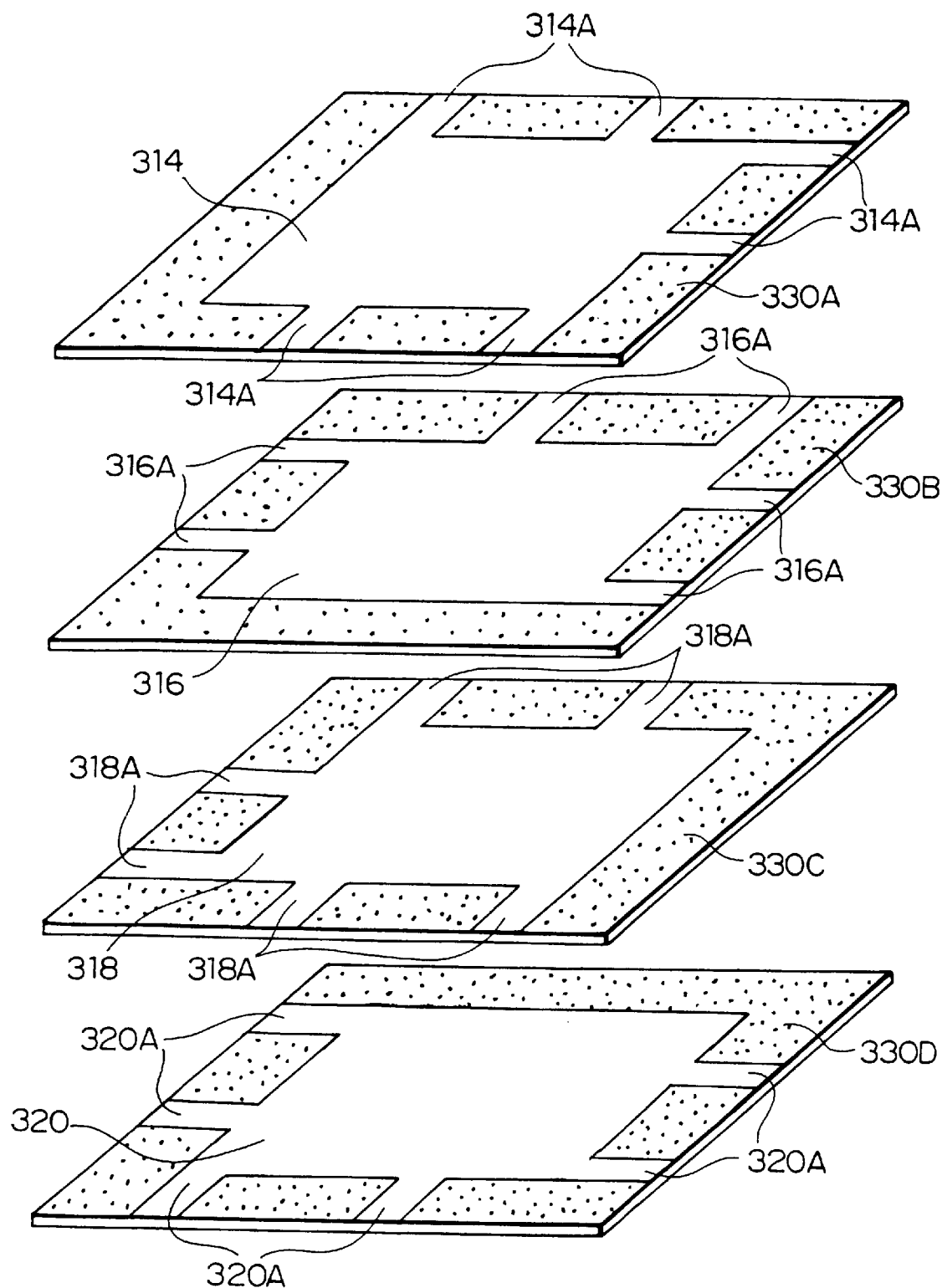
FIG. 28 is a disassembled perspective view of a plurality of ceramic green sheets and electrode shapes used in the process of production of the multiterminal multilayer capacitor of this embodiment.

Further, as shown in FIG. 28, by leading out two electrodes each to the top and bottom directions and right direction, that is, the total three directions, of the first internal electrode 314, three pairs of leads 314A are formed at the first internal electrode 314. Further, by leading out two electrodes each to the top direction and left and right directions, that is, the total three directions, of the second internal electrode 316 at positions not overlapping with the first internal electrode 314, three pairs of leads 316A are formed at the second internal electrode 316.

On the other hand, by leading out two electrodes each toward the top and bottom directions and left direction of the third internal electrode 318 at positions not overlapping with the second internal electrode 316, three pairs of leads 318A are formed at the third internal electrode 318. Further, by leading out two electrodes each toward the bottom direction and left and right directions of the fourth internal electrode 320 at positions not overlapping the third internal electrode 318, three pairs of leads 320A are formed at the fourth internal electrode 320.

Due to the above, the leads 314A, 316A, 318A, and 320A are led out from the internal electrodes 314, 316, 318, and 320 toward the three side faces 312B of the capacitor body 312. Further, those of the leads 314A of the first internal electrode 314 and the leads 318A of the third internal electrode 318 oriented in the same direction are arranged at the same positions when stacking the internal electrodes 314 and 318. Further, those of the leads 316A of the second internal electrode 316 and the leads 320A of the fourth internal electrode 320 oriented in the same direction are arranged at the same positions when stacking the internal electrodes 316 and 320.

Further, as shown in FIG. 25 to FIG. 27, the first terminal electrodes 322 connected to the leads 314A of the internal electrode 314A and the leads 318A of the third internal electrode 318 are arranged at the four side faces 312B of the capacitor body 312. Further, the second terminal electrodes 324 connected to the leads 316A of the second internal electrode 316 and the leads 320A of the fourth internal electrode 320 are arranged at the four side faces 312B of the capacitor body 312.

Further, since the leads 314A and 318A of the internal electrodes 314 and 318 and the leads 316A and 320A of the internal electrodes 316 and 320 are positioned alternately without overlap, the first terminal electrodes 322 connected to the leads 314A and 316A and the second terminal electrodes 324 connected to the leads 316A and 320A are arranged at the side faces 312B of the capacitor body 312 in an adjoining manner. Due to the relationship of the electrodes being led out from the leads to the three directions, each of the first terminal electrodes 322 is connected to only the leads 314A or only the leads 318A, while each of the second terminal electrodes 324 is connected to only the leads 316A or leads 320A.

Due to the above, in the present embodiment, four each of the terminal electrodes 322, 324 are arranged at four faces of the six faces of the multiterminal multilayer capacitor 310 made the rectangular parallelopiped, that is, the hexagonal shape.

Next, an explanation will be given of the method of production of the multiterminal multilayer capacitor 310 according to the present embodiment with reference to FIG. 28.

First, when producing the multiterminal multilayer capacitor 310, a plurality of ceramic green sheets 330A, 330B, 330C, and 330D comprised of dielectric materials functioning as capacitors is provided.

As shown in FIG. 28, to form the first internal electrode 314 having two leads 314A each in the top and bottom direction and the right direction, for example conductive paste is printed or deposited on the top surface of the ceramic green sheet 330A in accordance with the pattern of the first internal electrode 314. To form the second internal electrode 316 having two leads 316A in each of the top direction and left and right directions on the top face of the ceramic green sheet 330B positioned below the ceramic green sheet 330A, for example conductive paste is printed or deposited in accordance with the pattern of the second internal electrode 316.

Further, to form the third internal electrode 318 having two leads each 318A in the top and bottom direction and the left direction on the top surface of the ceramic green sheet 330C positioned under the ceramic green sheet 330B, similarly conductive paste is printed or deposited in accordance with the pattern of the third internal electrode 318. To form the fourth internal electrode 320 having two leads 320A each in the bottom direction and left and right directions on the top face of the ceramic green sheet 330D positioned below the ceramic green sheet 330C, similarly conductive paste is printed or deposited in accordance with the pattern of the fourth internal electrode 320.

Next, the ceramic green sheets 330A, 330B, 330C, and 330D with rectangular planar shapes are stacked and the first terminal electrode 322 connected to the leads 314A and 318A of the internal electrodes 314 and 318 and the second terminal electrode 324 connected to the leads 316A and 320A of the internal electrodes 316 and 320 are arranged around the stacked ceramic green sheets.

Further, the top face of the first internal electrode 314 and the portions between the terminal electrodes 322 and 324 are covered by the same material as the ceramic green sheets which is then cofired so as to obtain a multiterminal multilayer capacitor 310 with terminal electrodes 322 and 324 arranged at the four side faces 312B of the capacitor body 312.

Next, the action of the multiterminal multilayer capacitor 310 according to the present embodiment will be explained.

Four internal electrodes 314, 316, 318, and 320 are arranged separated by ceramic layers 312a in the capacitor body 312 formed by stacking ceramic or other dielectric layers. Further, these four internal electrodes 314 to 320 have leads 314A, 316A, 318A, and 320A led out toward three side faces of the capacitor body 312. A total of 16 terminal electrodes 322 and 324 arranged outside the capacitor body 312 are connected to the four internal electrodes 314 to 320 through the leads 314A to 320A.

When these total 16 terminal electrodes 322 and 324 are supplied with current, they alternately become positive and negative polarities and the four internal electrodes 314 to 320 connected to the terminal electrodes 322 to 324 through the leads 314A to 320A are arranged in parallel facing each other and form electrodes of capacitors.

Due to the above, the leads 314A, 316A, 318A, and 320A of the four internal electrodes 314, 316, 318, and 320 are led out toward three side faces 312B of the capacitor body 312. Therefore, currents flow straight by short routes at the time of carrying a current along with the effective use of the space around the internal electrodes compared with a conventional multiterminal multilayer capacitor where the leads are led out in two directions. Further, the positive and negative currents intersect two-dimensionally more to cancel out the magnetic fluxes among the four internal electrodes 314, 316, 318, and 320 in the multilayer electronic device 310. As a result, the parasitic inductance of the multilayer electronic device 310 itself is sharply reduced.

As a result, in the present embodiment, by reducing the parasitic inductance of the multiterminal multilayer capacitor 310 itself by the effect of cancellation of the magnetic fluxes, the ESL is reduced.

On the other hand, in the present embodiment, the capacitor body 312 is formed to a hexagonal shape, the first terminal electrodes 322 are connected to the internal electrodes 314 and 318, and the second terminal electrodes 324 are connected to the internal electrodes 316 and 320, so the adjoining terminal electrodes 322 and 324 at the side faces 312B are connected to mutually different internal electrodes and these terminal electrodes 322 and 324 are arranged at the four side faces 312B of the hexagonal capacitor body 312.

Therefore, since the terminal electrodes 322 and 324 are provided at the four side faces 312B of the hexagonal capacitor body 312, the routes over which the currents flow become the shortest along with maximum use of the space around the capacitor body 312. Further, when supplying high frequency currents to the terminal electrodes 322 and 324 so that the terminal electrodes 322 and 324 of the side faces 312B become alternately positive and negative, currents flow from the terminal electrodes 322 and 324 of the four side faces 312B to the internal electrodes 314, 316, 318, and 320 along with the four internal electrodes 314, 316, 318, and 320 connected to the terminal electrodes 322 and 324 becoming positive and negative polarities and intersect and as a result the parasitic inductance further falls.

Further, the adjoining terminal electrodes 322 and 324 at the side faces of the capacitor body 312 are arranged connected to mutually different internal electrodes 314 and 318 and internal electrodes 316 and 320. Therefore, currents flow so that the polarities of the adjoining terminal electrodes 322 and 324 become mutually different and the effect of the magnetic fluxes created canceling each other out due to the high frequency currents flowing in the internal electrodes 314, 316, 318, and 320 in mutually opposite directions is further enhanced.

Next, a more detailed explanation will be given of the flow of currents in the multiterminal multilayer capacitor 310 according to the present embodiment using FIG. 29.

Figure 29:
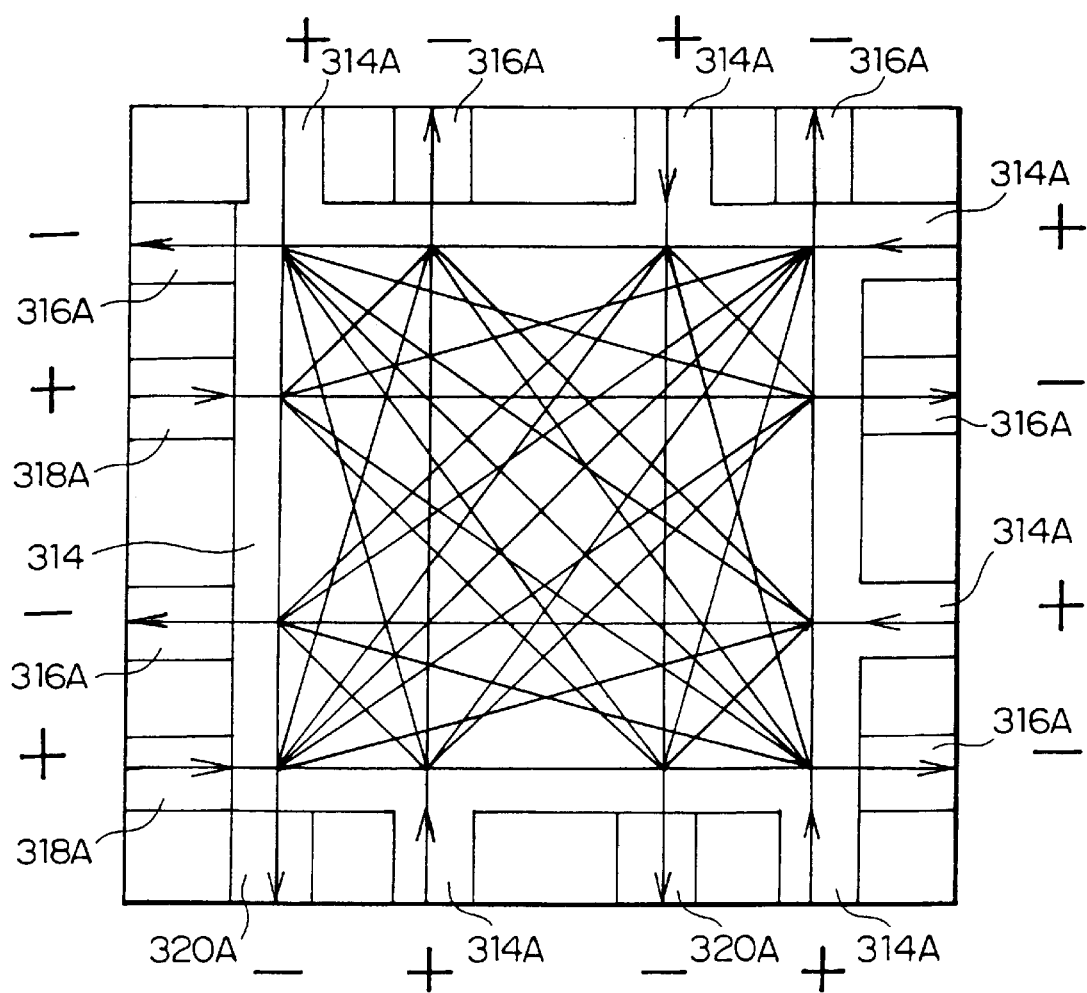
FIG. 29 is a view explaining the flow of current in the multiterminal multilayer capacitor according to this embodiment.

As shown in FIG. 29 which shows the state of the four internal electrodes 314, 316, 318, and 320 overlaid, the currents flow from the terminal electrodes 322 through the leads 314A and 318A into the internal electrodes 314 and 318 at the illustrated times and then flow through the leads 316A and 320A from the terminal electrodes 324 outside of the internal electrodes 316 and 320. In the case of high frequency currents, however, they become opposite the next instant. Further, when current flows, magnetic fluxes determined in direction by the direction of the current are induced and a parasitic inductance arises.

In the multiterminal multilayer capacitor 310 according to the present embodiment, however, as shown in FIG. 29, the current flowing in from the leads 314A and 318A of the internal electrodes 314 and 318 spreads to a large angle and the currents gathered at the large angles flow out from the leads 316A and 320A of the internal electrodes 316 and 320.

That is, since currents flow in various directions, the majority of the magnetic flux induced due to current is canceled out between adjoining internal electrodes and therefore a large magnetic flux is not generated. Therefore, the parasitic inductance becomes smaller and along with this the ESL is reduced.

Next, results of tests conducted to compare the ESL and ESR between the multiterminal multilayer capacitor 310 according to the present embodiment and another capacitor will be shown.

The ESL of the ordinary 3216 type multilayer ceramic capacitor was found to be 1250 pH and the ESL of the conventional multiterminal multilayer capacitor was found to be 105 pH, while the ESL of the multiterminal multilayer capacitor 310 according to the present embodiment was found to be a small 45 pH. Further, the electrostatic capacities of the capacitors used for the tests were 1 $\mu$F. Further, the "3216 type" means a type of a size of a longitudinal 3.2 mm and a lateral 1.6 mm.

In the above embodiment, the direction of lead out of the leads of the internal electrodes was successively rotated counter clockwise from the first internal electrode 314 to fourth internal electrode 320, but it may also be successively rotated clockwise. The leads may also be arranged in other orders.

Note that the present invention is not limited to the above-mentioned embodiments and may be changed in various ways within the scope of the present invention.

What is claimed is:

1. A multilayer electronic device comprising:
   a capacitor body formed by stacking dielectric layers;
   a plurality of internal electrodes separated by dielectric layers inside said capacitor body, each having at least one lead led out toward any side face of said capacitor body, and differing in position of arrangement of said lead with the nearby internal electrodes; and
   a plurality of terminal electrodes arranged at the outside surface of the capacitor body and connected to any of the plurality of internal electrodes through the leads;
   wherein the internal electrodes being divided into blocks of electrode patterns of a plurality of internal electrodes adjoining each other via said dielectric layers, and the electrode patterns of the internal electrodes belonging to the different blocks being the same in the shapes of the electrode patterns, but different in rotational positions about an axis perpendicular to the planes of the electrode patterns.

2. The multilayer electronic device as set forth in claim 1, wherein the capacitor body is shaped as a hexagon and the plurality of terminal electrodes are arranged at each of at least two side faces among the four side faces of the hexagonal capacitor body.

3. The multilayer electronic device as set forth in claim 2, wherein the terminal electrodes adjoining each other at the same side face where a plurality of terminal electrodes are provided are connected to the different internal electrodes.

4. The multilayer electronic device as set forth in claim 1, wherein the capacitor body is shaped as a hexagon and the plurality of terminal electrodes are arranged at each of the four side faces of the hexagonal capacitor body.

5. The multilayer electronic device as set forth in claim 4, wherein the terminal electrodes adjoining each other at the same side face where a plurality of terminal electrodes are provided are connected to different internal electrodes.

6. A method of producing a multilayer electronic device comprising the steps of:

forming on a dielectric layer an internal electrode of a pattern with at least one lead led out;

stacking the dielectric layers on which the internal electrodes of patterns different from each other are formed to prepare blocks respectively having a plurality of the same repeating electrode patterns; and stacking a plurality of the blocks in a state where the plurality of blocks are rotated about an axis orthogonal to the planes of the internal electrodes so that the blocks adjoining each other in the stacking direction are at mutually different rotational positions so as to form a capacitor body.

7. The method of producing a multilayer electronic device as set forth in claim 6, further comprising, when stacking the plurality of blocks to form the capacitor body, forming the capacitor body in a hexagonal shape, arranging a plurality of terminal electrodes at each of the four side faces of the hexagonal capacitor body, and connecting the terminal electrodes to any of the internal electrodes through the leads.

8. The multilayer electronic device as set forth in claim 1, wherein the number of the terminal electrode is from 4 to 8.

9. The multilayer electronic device as set forth in claim 1, wherein the number of the terminal electrode is from 10 to 16.

10. The multilayer electronic device as set forth in claim 1, wherein two to sixteen independent capacitor circuits are formed in the capacitor body.

* * * * *